United States Patent
Lan et al.

(10) Patent No.: US 9,682,465 B2
(45) Date of Patent: Jun. 20, 2017

(54) MAGAZINE TYPE SCREWING DEVICE AND SCREW SUPPLEMENT DEVICE

(71) Applicant: Primax Electronics Ltd., Neihu, Taipei (TW)

(72) Inventors: Chia-Tsui Lan, Taipei (TW); Wen Pin Tsao, Taipei (TW)

(73) Assignee: PRIMAX ELECTRONICS LTD., Taipei (TW)

( * ) Notice: Subject to any disclaimer, the term of this patent is extended or adjusted under 35 U.S.C. 154(b) by 730 days.

(21) Appl. No.: 14/251,963

(22) Filed: Apr. 14, 2014

(65) Prior Publication Data

US 2015/0165607 A1    Jun. 18, 2015

(30) Foreign Application Priority Data

Dec. 17, 2013    (TW) .............................. 102146617 A

(51) Int. Cl.
| | |
|---|---|
| *B25B 23/10* | (2006.01) |
| *B25B 23/06* | (2006.01) |
| *B25B 21/00* | (2006.01) |
| *B25B 23/04* | (2006.01) |

(52) U.S. Cl.
CPC ............ *B25B 23/06* (2013.01); *B25B 21/002* (2013.01); *B25B 23/04* (2013.01); *B25B 23/10* (2013.01); *B25B 23/045* (2013.01)

(58) Field of Classification Search
CPC ....... B25B 23/06; B25B 21/002; B25B 23/04; B25B 23/10; B25B 23/045; B23P 19/006
USPC ................... 81/57.37, 57.22, 57.23
See application file for complete search history.

(56) References Cited

U.S. PATENT DOCUMENTS

| | | | | |
|---|---|---|---|---|
| 5,398,616 A | * | 3/1995 | Eidemanis | .............. B23P 19/06 104/17.2 |
| 5,855,151 A | * | 1/1999 | Habermehl | ........... B25B 23/045 81/434 |
| 6,227,429 B1 | * | 5/2001 | Huang | .................... B25C 1/003 227/119 |
| 2006/0053978 A1 | * | 3/2006 | Arai | ........................ B25B 23/04 81/57.37 |
| 2007/0102440 A1 | * | 5/2007 | Matthiesen | ............. B25B 21/00 221/156 |
| 2007/0261518 A1 | * | 11/2007 | Hsu | ....................... B25B 23/045 81/57.37 |

(Continued)

*Primary Examiner* — Larry E Waggle, Jr.
*Assistant Examiner* — Danny Hong
(74) *Attorney, Agent, or Firm* — Kirton McConkie; Evan R. Witt

(57) ABSTRACT

A magazine type screwing device and a screw supplementary device are provided. The screwing device includes a screwdriver bit with a protrusion part, a storing portion, and a screw stopping portion. The storing portion includes a tubular structure and a slide rail, which are connected with each other. The screwdriver bit is installed in the tubular structure. The screws are disposed within the slide rail. After the screwdriver bit is moved within the tubular structure in a first direction and then the screwdriver bit is moved within the tubular structure in a second direction, one of the screws is detached from the screw stopping portion and introduced into the tubular structure. The screw supplementary device includes a screw transferring portion and a screw feeding portion. The screw transferring portion includes a first conveying track, a sensing element over the first conveying track, a gear, and a first motor.

22 Claims, 21 Drawing Sheets

(56) References Cited

U.S. PATENT DOCUMENTS

2008/0276761 A1* 11/2008 Hale ................. B25B 23/10
                                                                                   81/57.37
2012/0318108 A1* 12/2012 Kieber ............. B25B 23/045
                                                                                    81/434
2013/0112050 A1*  5/2013 Hoffman .......... B25B 23/045
                                                                                    81/434
2014/0338505 A1* 11/2014 Foser ............... B25B 23/045
                                                                                    81/434

\* cited by examiner

US 9,682,465 B2

MAGAZINE TYPE SCREWING DEVICE AND SCREW SUPPLEMENT DEVICE

FIELD OF THE INVENTION

The present invention relates to a magazine type screwing device and a screw supplementary device, and more particularly to a magazine type screwing device having a function of storing and automatically feeding screws and a screw supplementary device for automatically loading screws into the screwing device.

BACKGROUND OF THE INVENTION

As known, the use of a screwdriver to manually tighten a screw into an object is time-consuming and labor-intensive. Recently, the cooperation of an electric screwdriver and a screwdriver bit is gradually adopted to achieve time-saving and labor-saving efficacy. However, most of the conventional electric screwdrivers do not have the function of storing and automatically feeding screws. After every screwing operation is performed, the user has to manually take a single screw and attach the screw on a screwing part of the screwdriver bit. In other words, the conventional electric screwdrivers are not user-friendly.

For solving the above drawbacks, a screwing device with a function of storing and automatically feeding screws has been disclosed. FIG. 1 is a schematic side view illustrating a conventional screwing device. The conventional screwing device 1 is disclosed in U.S. Pat. No. 4,998,452. As shown in FIG. 1, the conventional screwing device 1 comprises plural storing portions 10, plural screws 11, a feeding portion 12, a first spring 13, a base 14, a shank 15, a screwdriver bit 16, a tubular body 17, and a second spring 18. The screwdriver bit 16 comprises a first stopping part 161 and a screwing part 162. The tubular body 17 comprises a second stopping part 171 and a third stopping part 172.

For assembling the conventional screwing device 1, the screws 11 are firstly stored in the plural storing portions 10, respectively. Then, the plural storing portions 10 that store the screws 11 are placed on the base 14 within the feeding portion 12. The first spring 13 is arranged between the base 14 and a bottom of the feeding portion 12.

Moreover, the tubular body 17 is connected with the feeding portion 12, the screwdriver bit 16 is disposed within the tubular body 17, and the shank 15 is connected with the first stopping part 161 of the screwdriver bit 16. The screwdriver bit 16 is movable within the tubular body 17 back and forth. Since the first stopping part 161 of the screwdriver bit 16 is stopped by the second stopping part 171 and the third stopping part 172, the screwdriver bit 16 is not detached from the tubular body 17. The second spring 18 is arranged between the first stopping part 161 and the second stopping part 171 for returning the screwdriver bit 16 to its original position.

When the shank 15 and the screwdriver bit 16 are pushed to be moved toward the screw 11, the screwing part 162 is locked into a head part of the screw 11 and a tip of the threaded part of the screw 11 is contacted with a surface of an object. After an electric screwdriver (not shown) connected with the shank 15 is started, the shank 15 drives rotation of the screwdriver bit 16 in order to tighten the screw 11 into the object.

When the electric screwdriver is turned off and the shank 15 is no longer pushed by the user, in response to the elastic force of the second spring 18, the screwdriver bit 16 is moved in the direction away from the screw 11 and the feeding portion 12 until the first stopping part 161 is contacted with the third stopping part 172.

FIG. 2 is a schematic side view illustrating the feeding portion and an ejector of the conventional screwing device. Please refer to FIGS. 1 and 2. The conventional screwing device 1 further comprises an ejector 19 and a third spring 100. The ejector 19 is penetrated through the feeding portion 12 and located beside the topmost storing portion 10. The third spring 100 is arranged around the ejector 19 for returning the ejector 19 to its original position. In case that no screw 11 is stored in the topmost storing portion 10, the user may press the ejector 19 to allow a distal end 191 of the ejector 19 to eject the topmost storing portion 10 out of the feeding portion 12. Under this circumstance, since the number of the storing portions 10 over the base 14 is reduced, the external force applied on the first spring 13 is decreased. Meanwhile, in response to the restoring force of the first spring 13, the base 14 and the remaining storing portions 10 are moved upwardly. Consequently, another storing portion 10 with the screw 11 is located at the topmost position of the feeding portion 12 corresponding to the screwing part 162 of the screwdriver bit 16 again.

As mentioned above, for loading the screws 11 into the conventional screwing device 1, it is necessary to accommodate the screws 11 within the storing portions 10 and then place the storing portions 10 into the feeding portion 12. Moreover, after the topmost storing portion 10 is ejected out by pressing the ejector 19, the subsequent screwing action can be continuously performed by the screwing device 1. In other words, the overall structure is complicated, and the operation is inconvenient.

Therefore, there is a need of providing an improved screwing device and an improved screw supplementary device in order to overcome the above drawbacks.

SUMMARY OF THE INVENTION

An object of the present invention provides a screwing device with a simplified structure, in which the screwing device can be easily operated and screws can be easily loaded into the screwing device.

Another object of the present invention provides a screw supplementary device for automatically loading screws.

In accordance with an aspect of the present invention, there is provided a magazine type screwing device. The magazine type screwing device includes a screwdriver bit, a storing portion, and a screw stopping portion. The screwdriver bit includes a protrusion part. At least one screw is tightened into an object by the screwdriver bit. The storing portion accommodates the screwdriver bit and the at least one screw. The storing portion includes a tubular structure and a slide rail. The tubular structure includes an opening. The screwdriver bit is installed in the tubular structure and movable within the tubular structure back and forth. The slide rail is connected with the tubular structure. A distal end of the slide rail is located near the opening. The at least one screw is disposed within the slide rail and movable within the slide rail. The screw stopping portion limits movement of the at least one screw. The screw stopping portion includes a rotating shaft, a first hook-shaped element, a first swinging block, a second hook-shaped element and a second swinging block. The rotating shaft is disposed on the tubular structure. The first hook-shaped element is pivotally coupled to the rotating shaft and rotatable relative to the slide rail. The first swinging block is pivotally coupled to the first hook-shaped element and inserted into the tubular structure. The second hook-shaped element is pivotally coupled to the rotating shaft and rotatable relative to the slide rail, and the second swinging block is pivotally coupled to the second hook-shaped element and inserted into the tubular structure. When the screwdriver bit is in a standby position, the first hook-shaped element and the second hook-shaped element are contacted with the slide rail to stop the at least one screw. When the screwdriver bit is moved in a first direction and the first swinging block is pushed by the protrusion part, the first hook-shaped element is pushed by the first swinging block to be moved away the slide rail, so that a specified screw of the at least one screw is moved to a region between the first hook-shaped element and the second hook-shaped element. When the screwdriver bit is moved in a second direction and the second swinging block is pushed by the protrusion part, the second hook-shaped element is pushed by second swinging block to be moved away the slide rail, so that the specified screw is introduced from the distal end of the slide rail to the tubular structure through the opening.

In accordance with another aspect of the present invention, there is provided a screw supplementary device for loading at least one screw into a screwing device. The screw supplementary device includes a screw transferring portion and a screw feeding portion. The screw transferring portion includes a first conveying track, a sensing element, a gear, and a first motor. The at least one screw is moved along the first conveying track. The sensing element is disposed over a rear end of the first conveying track. The gear is located beside the rear end of the first conveying track to control movement of the at least one screw. The first motor is connected with the gear to drive rotation of the gear. The screw feeding portion is connected with a front end of the first conveying track. The at least one screw is received within the screw feeding portion and transmitted to the first conveying track. When the gear is driven to be rotated by the first motor, the at least one screw is transferred through the gear and the sensing element and introduced into the screwing device that is connected with the first conveying track. When the gear is not driven to be rotated by the first motor, one of the at least one screw is stopped by a tooth part of the gear or engaged with a concave part of the gear, so that the at least one screw is no longer moved. When a number of the plural screws passing through the sensing element reaches a predetermined value, the first motor stops driving rotation of the gear.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

Figure 1:
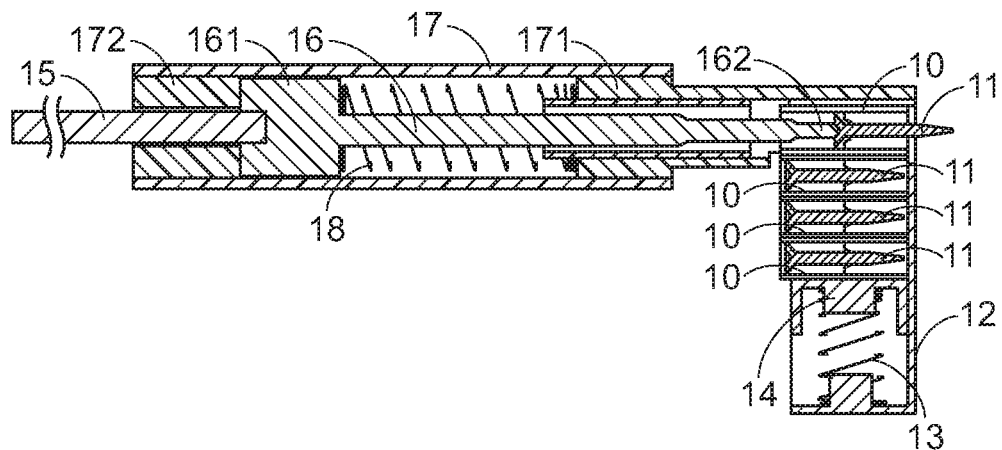
FIG. 1 is a schematic side view illustrating a conventional screwing device.
Figure 2:
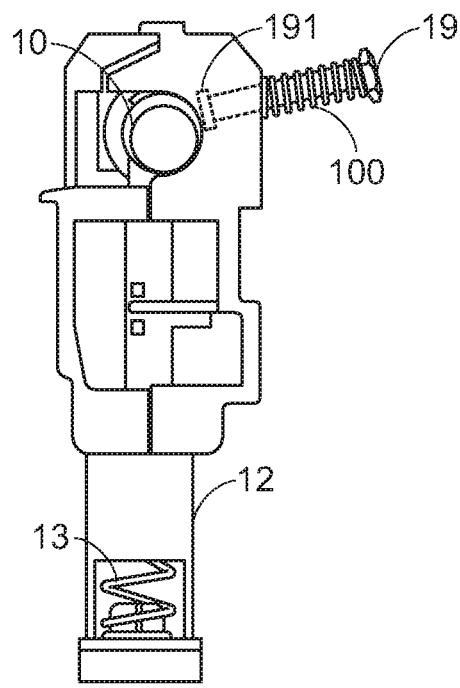
FIG. 2 is a schematic side view illustrating the feeding portion and an ejector of the conventional screwing device.
Figure 3:
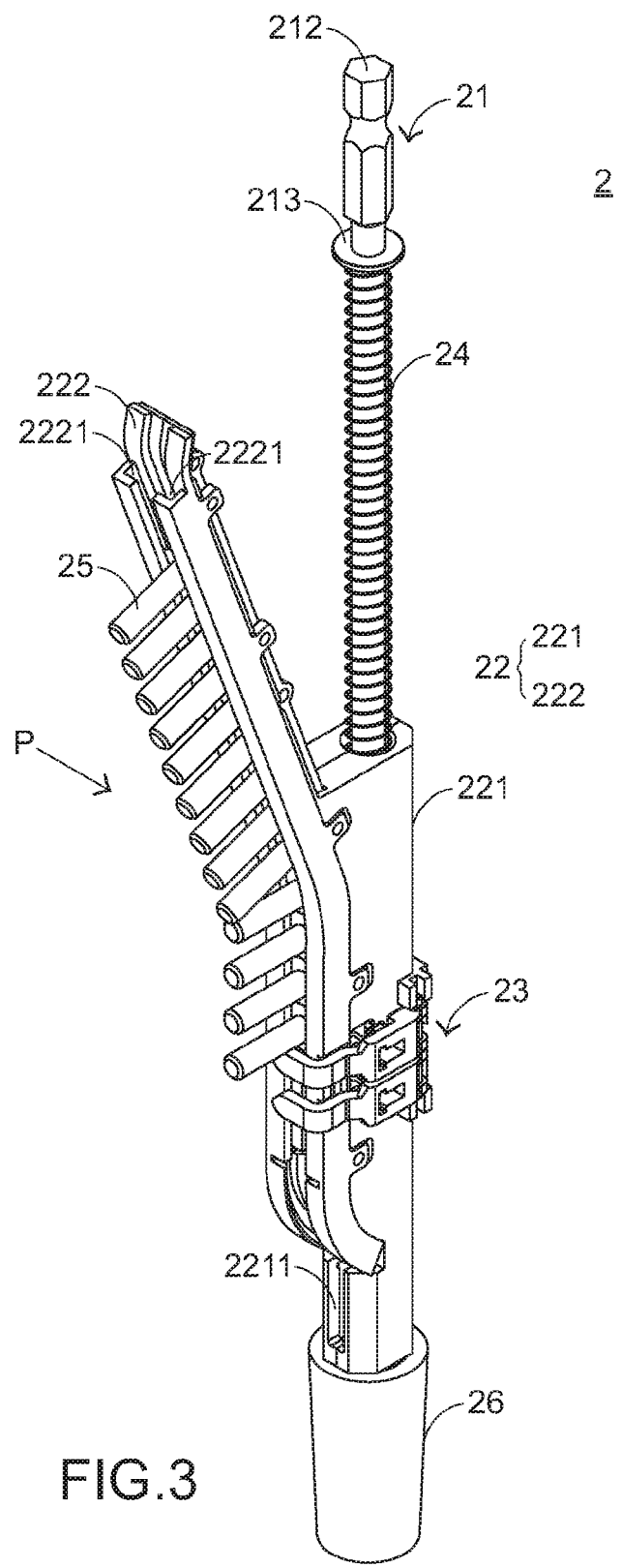
FIG. 3 is a schematic perspective view illustrating the outer appearance of a screwing device according to an embodiment of the present invention.
Figure 4:
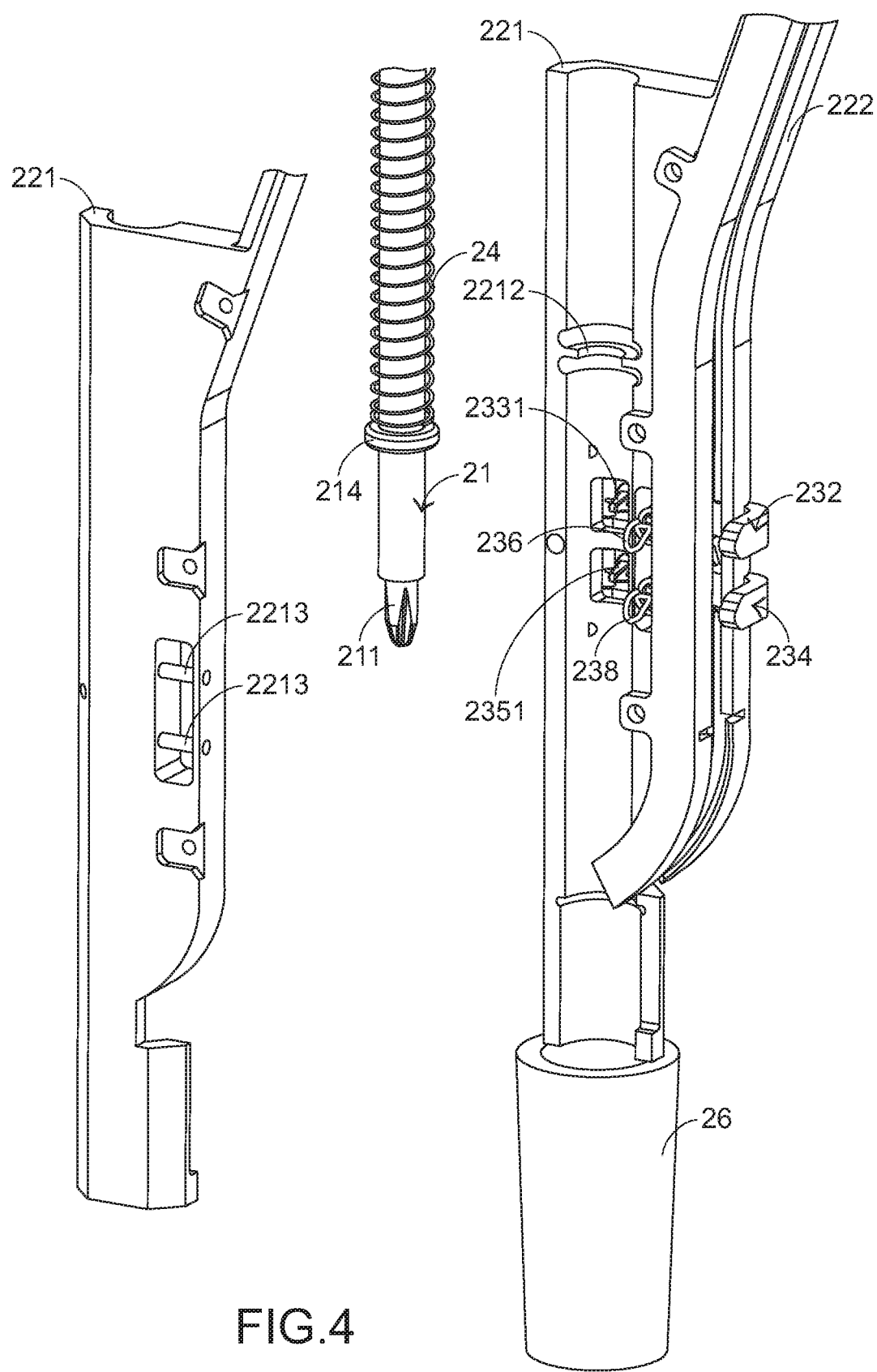
FIG. 4 is a first fragmentary exploded view illustrating the screwing device of FIG. 3 along a viewpoint P.
Figure 5:
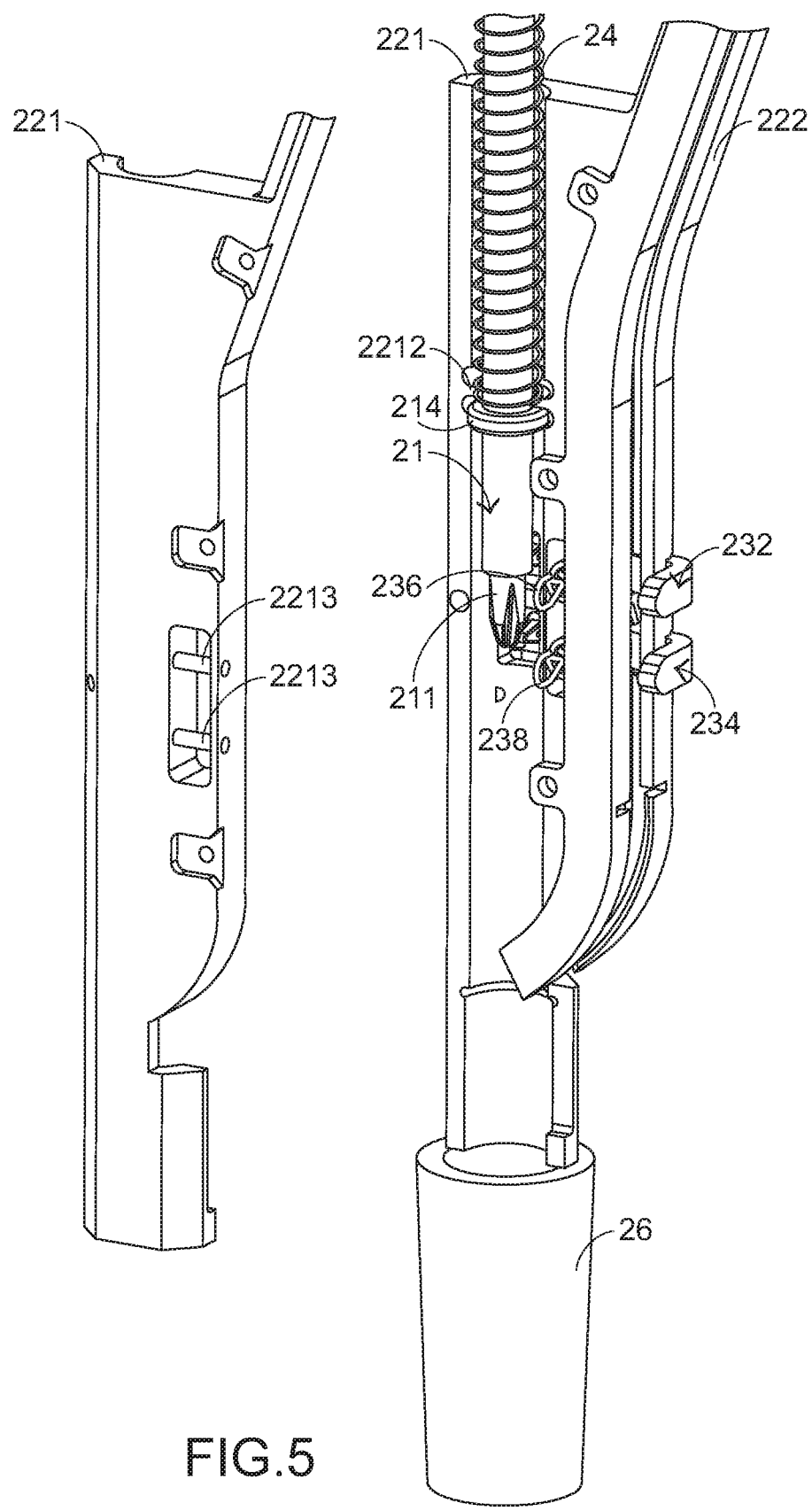
FIG. 5 is a second fragmentary exploded view illustrating the screwing device of FIG. 3 along the viewpoint P.

The present invention provides a screwing device. Hereinafter, the components and the assembling procedures of the screwing device 2 according to an embodiment of the present invention will be illustrated with reference to FIGS. 3, 4 and 5. FIG. 3 is a schematic perspective view illustrating the outer appearance of a screwing device according to an embodiment of the present invention. FIG. 4 is a first fragmentary exploded view illustrating the screwing device of FIG. 3 along a viewpoint P. FIG. 5 is a second fragmentary exploded view illustrating the screwing device of FIG. 3 along the viewpoint P.

As shown in FIG. 3, the screwing device 2 comprises a screwdriver bit 21, a storing portion 22, a screw stopping portion 23, a first elastic element 24, and plural screws 25.

The storing portion 22 comprises a tubular structure 221 and a slide rail 222. Moreover, an opening 2211 is located at a first side of the tubular structure 221. The slide rail 222 is connected with the tubular structure 221. In addition, a distal end of the slide rail 222 is located near the opening 2211. In this embodiment, the tubular structure 221 and the slide rail 222 are different parts. Alternatively, in some other embodiments, the tubular structure 221 and the slide rail 222 are integrally formed with each other.

As shown in FIGS. 3 and 4, the screwdriver bit 21 comprises a screwing part 211, a fixing part 212, a stopper 213, and a protrusion part 214. The stopper 213 is located near the fixing part 212. The protrusion part 214 is located near the screwing part 211. The fixing part 212 has a hexagonal shape, but is not limited thereto. In some other embodiment, the fixing part 212 has a circular shape or any other appropriate shape mating the commercially available electric screwdrivers. Moreover, the protrusion part 214 is arranged around the screwdriver bit 21, but is not limited thereto. The position and shape of the protrusion part 214 are presented herein for purpose of illustration and description only.

As shown in FIGS. 3 and 5, the screwdriver bit 21 is installed in the tubular structure 221 and upwardly or downwardly moved within the tubular structure 221 in a reciprocating manner (i.e. back and forth). The first elastic element 24 is arranged around the screwdriver bit 21, and arranged between the stopper 213 and a bulge 2212 within the tubular structure 221. In case that the first elastic element 24 is not compressed, the screwdriver bit 21 is pushed to a standby position as shown in FIGS. 3 and 5 by the first elastic element 24. At the same time, the protrusion part 214 is contacted with the bulge 2212, so that the screwdriver bit 21 is not detached from the tubular structure 221.

The slide rail 222 is used for accommodating the screws 25 (see FIG. 3). The slide rail 222 has two C-shaped structures 2221, which are opposed to each other. Consequently, after the head parts of the screws 25 are inserted into the space between the two C-shaped structures 2221, the screws 25 may be moved downwardly along the slide rail 222.

Figure 6:
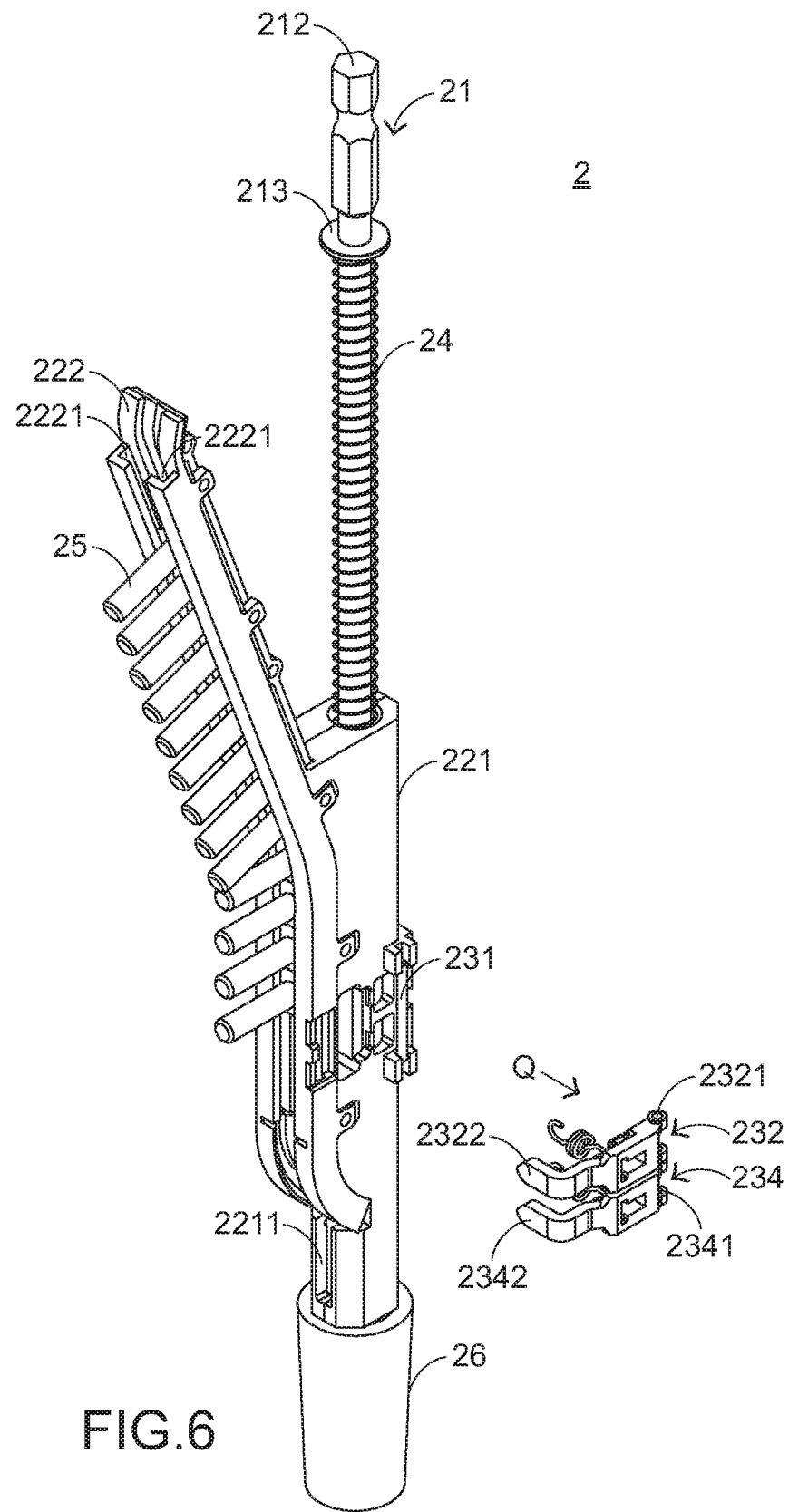
FIG. 6 is a schematic fragmentary exploded view illustrating the screwing device of FIG. 3.
Figure 7:
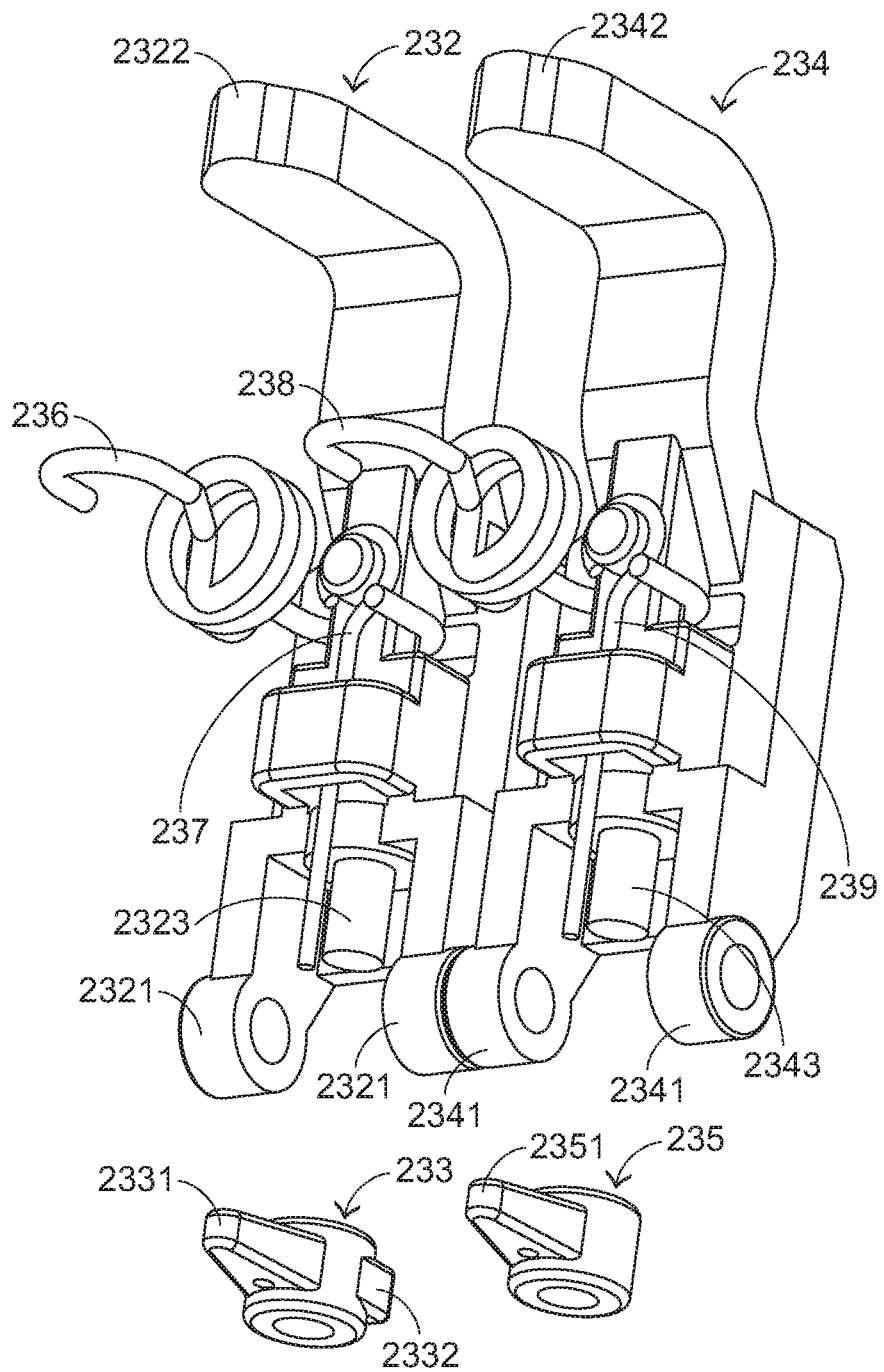
FIG. 7 is a schematic exploded view illustrating the screw stopping portion of the screwing device of FIG. 6 along a viewpoint Q.
Figure 8:
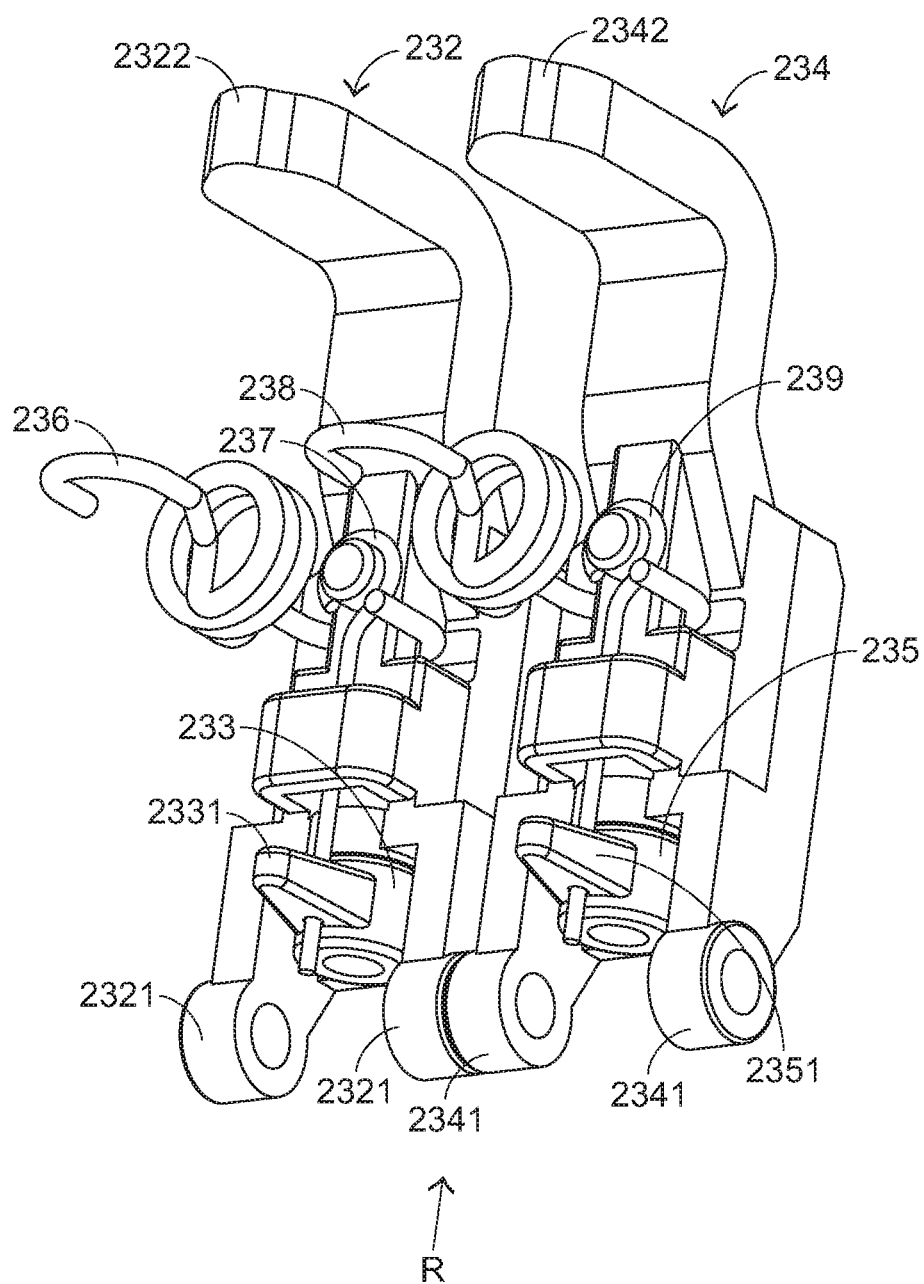
FIG. 8 is a schematic assembled view illustrating the screw stopping portion of the screwing device of FIG. 7.
Figure 9:
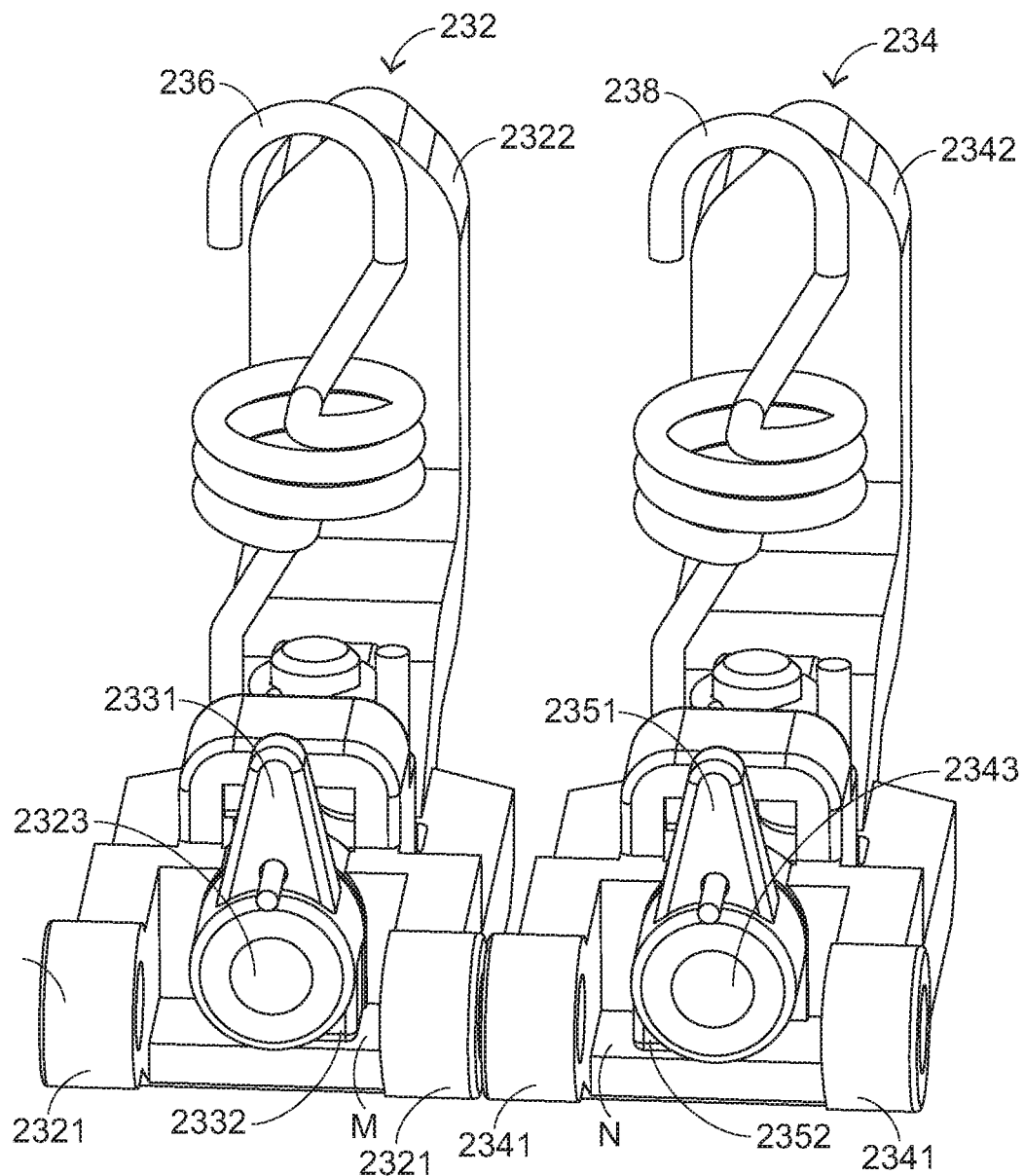
FIG. 9 is a schematic assembled view illustrating the screw stopping portion of the screwing device of FIG. 8 along a viewpoint R.

The screw stopping portion 23 is located at a second side of the tubular structure 221. The screw stopping portion 23 is used for limiting the movement of the screws 25. The function of limiting the movement of the screws 25 by the screw stopping portion 23 will be illustrated with reference to FIGS. 3, 4, 6, 7, 8 and 9. FIG. 6 is a schematic fragmentary exploded view illustrating the screwing device of FIG. 3. FIG. 7 is a schematic exploded view illustrating the screw stopping portion of the screwing device of FIG. 6 along a viewpoint Q. FIG. 8 is a schematic assembled view illustrating the screw stopping portion of the screwing device of FIG. 7. FIG. 9 is a schematic assembled view illustrating the screw stopping portion of the screwing device of FIG. 8 along a viewpoint R.

The screw stopping portion 23 comprises a rotating shaft 231, a first hook-shaped element 232, a first swinging block 233, a second hook-shaped element 234, a second swinging block 235, a second elastic element 236, a third elastic element 237, a fourth elastic element 238, and a fifth elastic element 239.

Please refer to FIGS. 3 and 6. For assembling the screw stopping portion 23, the rotating shaft 231 is located at the second side of the tubular structure 221. In addition, a first rear end 2321 of the first hook-shaped element 232 and a second rear end 2341 of the second hook-shaped element 234 are both pivotally coupled to the rotating shaft 231. Consequently, a first front end 2322 of the first hook-shaped element 232 and a second front end 2342 of the second hook-shaped element 234 are both rotatable back and forth relative to the slide rail 222. When the first front end 2322 of the first hook-shaped element 232 and the second front end 2342 of the second hook-shaped element 234 are contacted with the slide rail 222, the screws 25 fail to be moved downwardly along the slide rail 222.

The first hook-shaped element 232 is farther from the opening 2211 of the tubular structure 221 than the second hook-shaped element 234. That is, the first hook-shaped element 232 is farther from the distal end of the slide rail 222, and the second hook-shaped element 234 is closer to the distal end of the slide rail 222. In this embodiment, the included angle between the first rear end 2321 and the first front end 2322 of the first hook-shaped element 232 is about 90 degrees, and the included angle between the second rear end 2341 and the second front end 2342 of the second hook-shaped element 234 is about 90 degrees.

Please refer to FIGS. 7 and 8. The first hook-shaped element 232 further comprises a first connecting shaft 2323. The first swinging block 233 is pivotally coupled to the first connecting shaft 2323. The second hook-shaped element 234 further comprises a second connecting shaft 2343. The second swinging block 235 is pivotally coupled to the second connecting shaft 2343.

Please refer to FIGS. 4, 7 and 8. The second elastic element 236 is connected with the first hook-shaped element 232 and a fixing post 2213 of the tubular structure 221 in order to return the first hook-shaped element 232 to its original position. The third elastic element 237 is connected with the first hook-shaped element 232 and the first swinging block 233 in order to return the first swinging block 233 to its original position. The fourth elastic element 238 is connected with the second hook-shaped element 234 and another fixing post 2213 of the tubular structure 221 in order to return the second hook-shaped element 234 to its original position. The fifth elastic element 239 is connected with the second hook-shaped element 234 and the second swinging block 235 in order to return the second swinging block 235 to its original position.

As shown in FIGS. 4 and 9, the first swinging block 233 comprises a first pushing part 2331 and a second pushing part 2332. In case that the first swinging block 233 is not pushed, the first pushing part 2331 is inserted into the tubular structure 221. At the same time, the second pushing part 2332 is contacted with the first hook-shaped element 232, and located at a first side M of the first connecting shaft 2323 to face the second hook-shaped element 234.

The second swinging block 235 comprises a third pushing part 2351 and a fourth pushing part 2352. In case that the second swinging block 235 is not pushed, the third pushing part 2351 is inserted into the tubular structure 221. At the same time, the fourth pushing part 2352 is contacted with the second hook-shaped element 234, and located at a second side N of the second connecting shaft 2343 to face the first hook-shaped element 232.

Hereinafter, the operating principles of the screwing device 2 will be illustrated with reference to FIGS. 10-15. FIGS. 10-15 schematically illustrate six actions of the screwing device according to the embodiment of the present invention. For clarification and brevity, only one screw 25 is shown in FIGS. 10-15. It is noted that the number of the screws 25 is not restricted.

Figure 10:
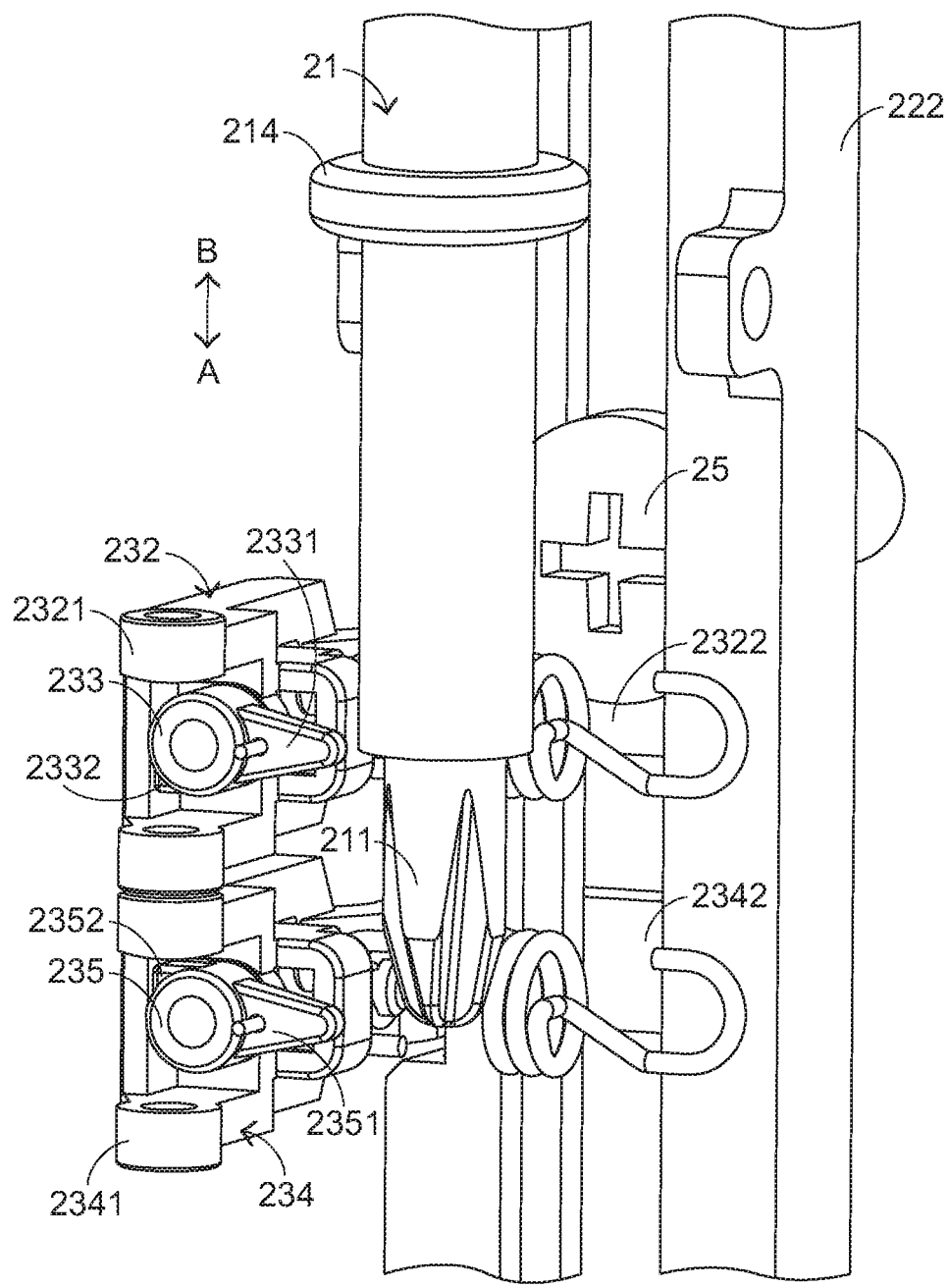
FIG. 10 schematically illustrates a first action of the screwing device according to the embodiment of the present invention.
Figure 11:
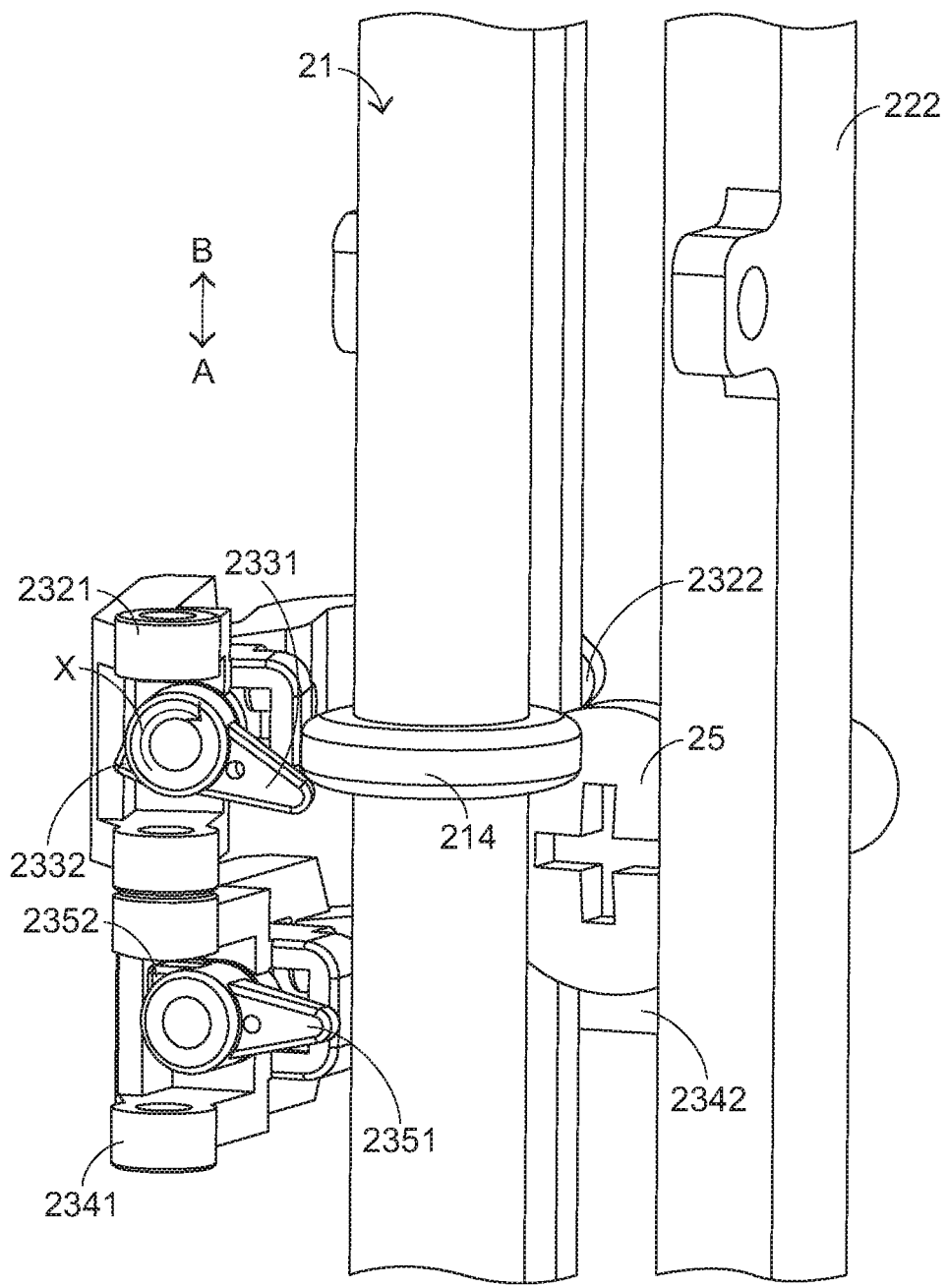
FIG. 11 schematically illustrates a second action of the screwing device according to the embodiment of the present invention.
Figure 12:
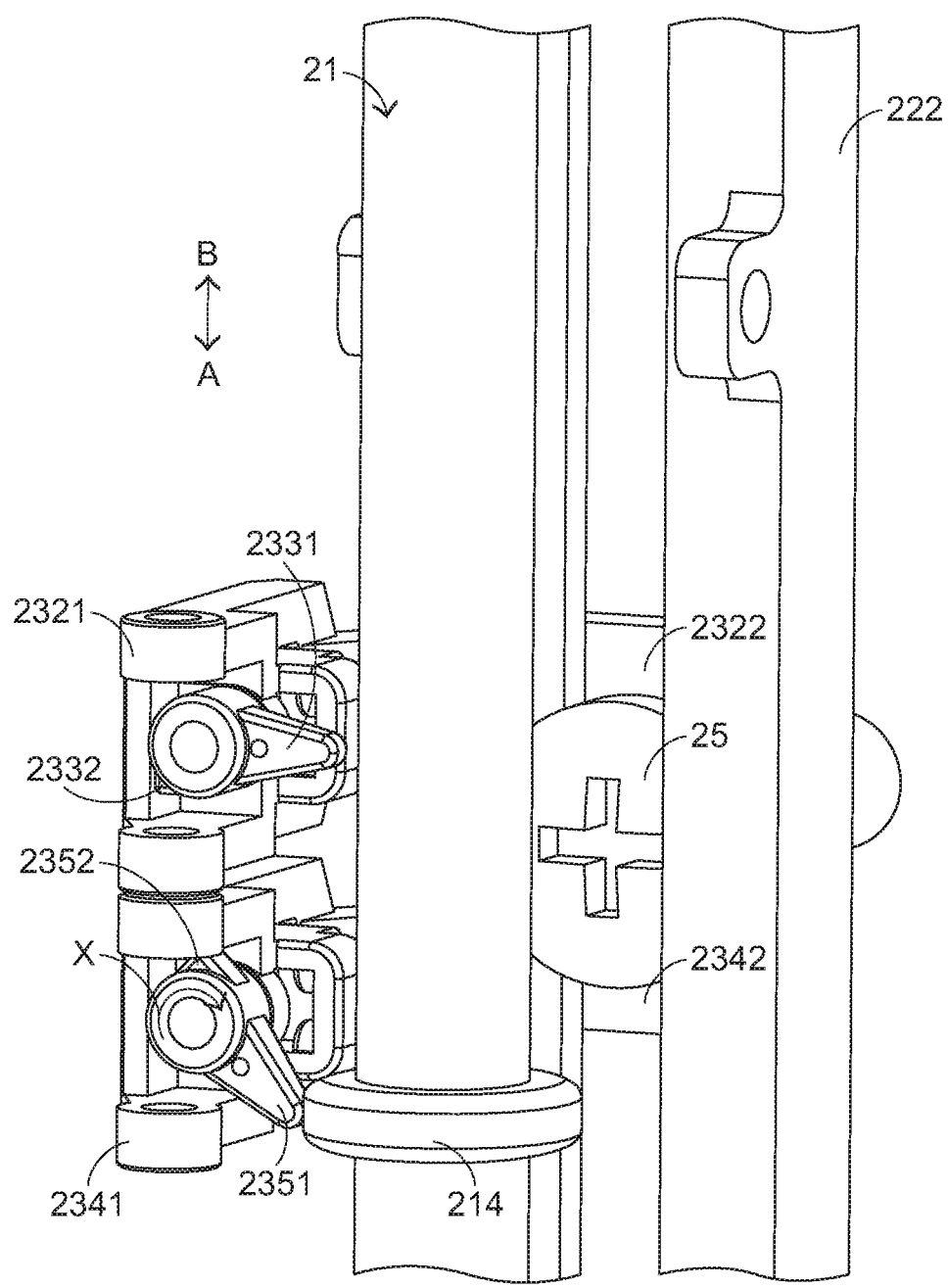
FIG. 12 schematically illustrates a third action of the screwing device according to the embodiment of the present invention.

Firstly, as shown in FIG. 10, the screwdriver bit 21 is in a standby position. Under this circumstance, one of the screws 25 is stopped by the first front end 2322 of the first hook-shaped element 232 and the second front end 2342 of the second hook-shaped element 234. Consequently, the screw 25 fails to be moved downwardly along the slide rail 222.

As mentioned above, since the first pushing part 2331 and the third pushing part 2351 are not pushed, the first pushing part 2331 and the third pushing part 2351 are inserted into the tubular structure 221 (see FIG. 4). When the screwdriver bit 21 is moved in a first direction A to the position shown in FIG. 11, the first pushing part 2331 of the first swinging block 233 is pushed by the protrusion part 214, so that the first swinging block 233 is rotated in a first rotation direction X. As the first swinging block 233 is rotated in the first rotation direction X, the first hook-shaped element 232 is pushed by the second pushing part 2332. Consequently, the first hook-shaped element 232 is rotated in a direction away from the slide rail 222. Under this circumstance, since the screw 25 is no longer stopped by the first hook-shaped element 232, the screw 25 is moved downwardly to the region between the first hook-shaped element 232 and the second hook-shaped element 234.

Then, the screwdriver bit 21 is continuously moved in the first direction A. When the protrusion part 214 is moved downwardly to push the third pushing part 2351 of the second swinging block 235, the second swinging block 235 is rotated in the first rotation direction X. Under this circumstance, since the second hook-shaped element 234 is not pushed by the fourth pushing part 2352, the screw 25 is stayed between the first hook-shaped element 232 and the second hook-shaped element 234. That is, the screw 25 fails to be continuously moved downwardly (see FIG. 12).

Figure 13:
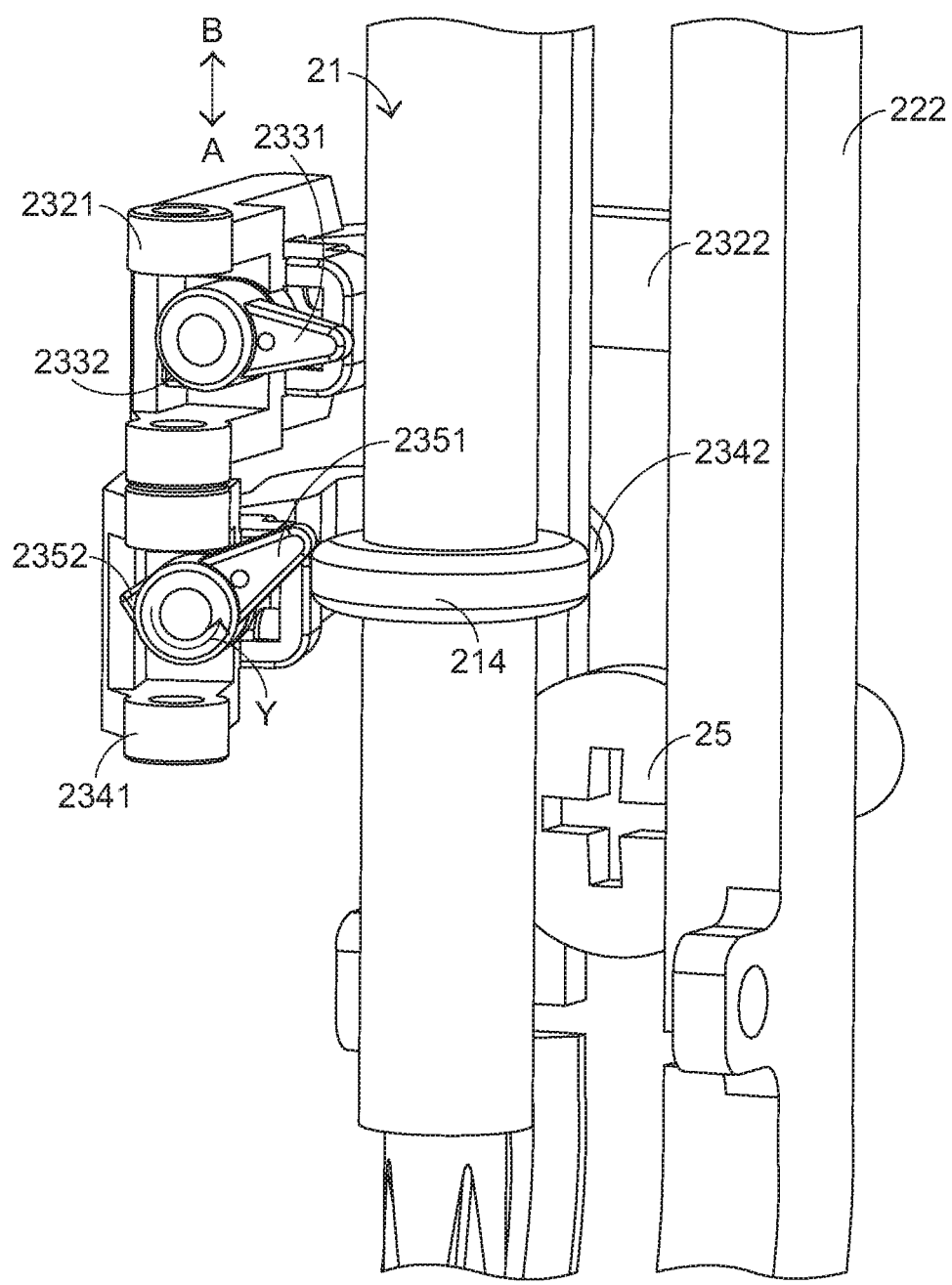
FIG. 13 schematically illustrates a fourth action of the screwing device according to the embodiment of the present invention.
Figure 14:
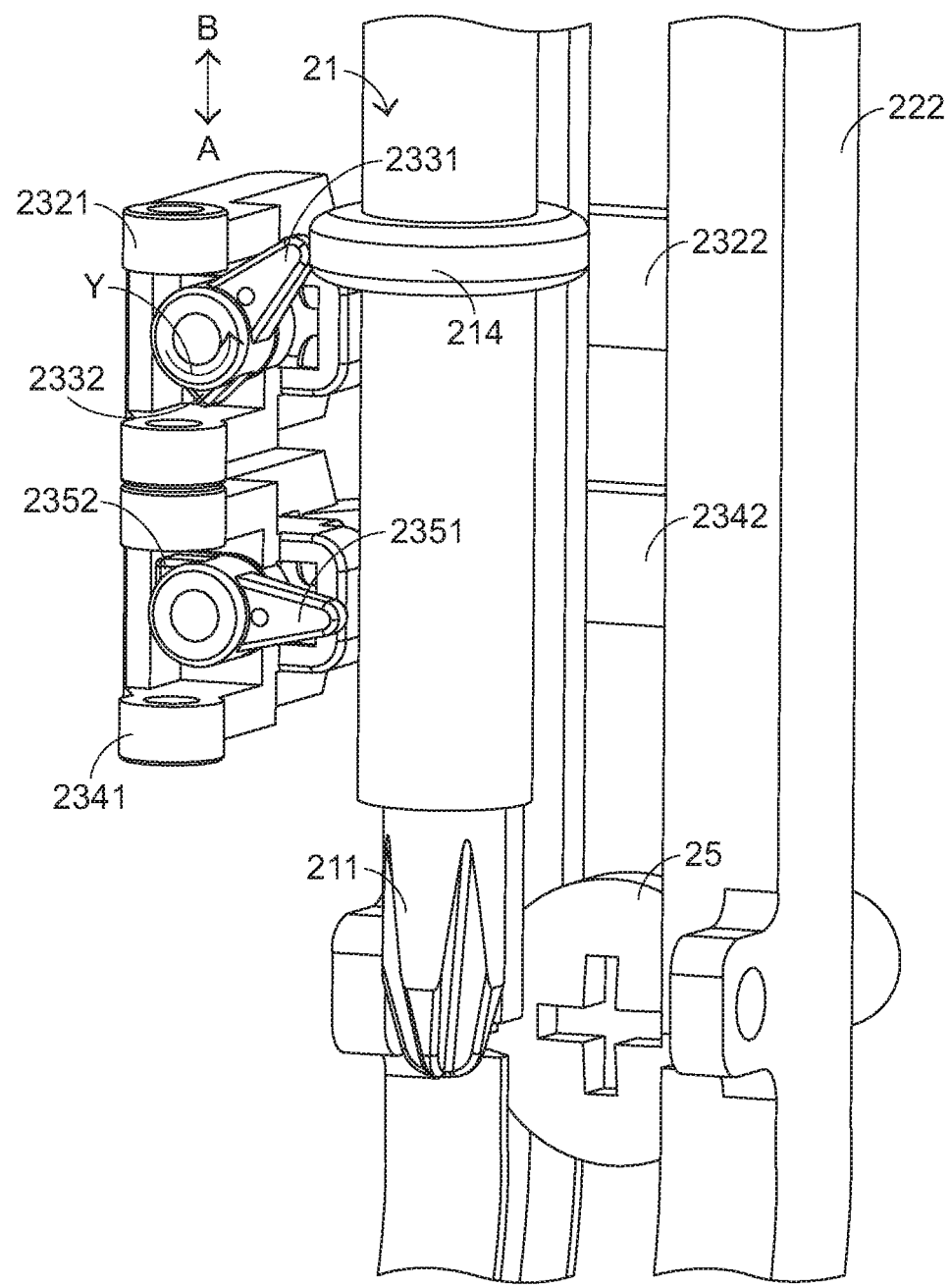
FIG. 14 schematically illustrates a fifth action of the screwing device according to the embodiment of the present invention.

Next, please refer to FIG. 13. When the screwdriver bit 21 is pulled upwardly in a second direction B by the user actively or when the screwdriver bit 21 is moved upwardly in the second direction B in response to the restoring force of the first elastic element 24, the third pushing part 2351 of the second swinging block 235 is pushed upwardly by the protrusion part 214. Consequently, the second swinging block 235 is rotated in a second rotation direction Y. As the second swinging block 235 is rotated in the second rotation direction Y, the second hook-shaped element 234 is pushed by the fourth pushing part 2352. Consequently, the second hook-shaped element 234 is rotated in a direction away from the slide rail 222. Under this circumstance, since the screw 25 is no longer stopped by the second hook-shaped element 234, the screw 25 is moved downwardly.

Figure 15:
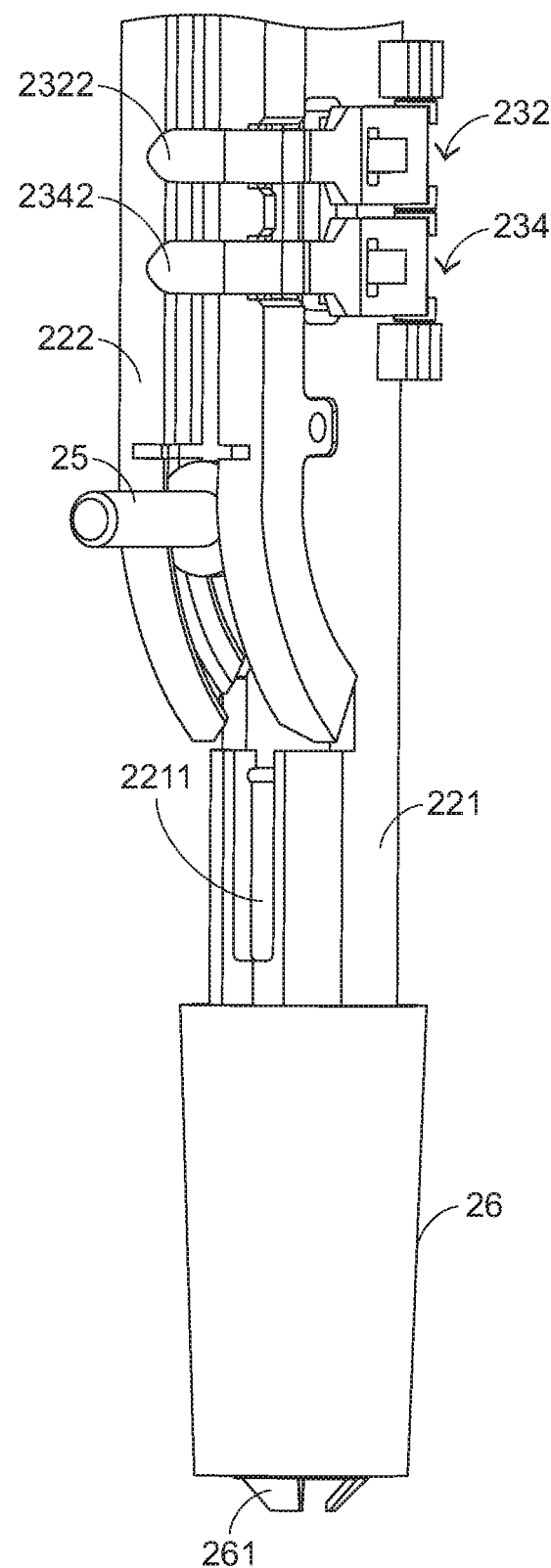
FIG. 15 schematically illustrates a sixth action of the screwing device according to the embodiment of the present invention.

When the screw 25 is moved to the distal end of the slide rail 222, the screw 25 is introduced into the tubular structure 221 through the opening 2211 of the tubular structure 221 (see FIG. 15). Please refer to FIG. 15. The screwing device 2 further comprises a covering portion 26. The covering portion 26 is connected with the tubular structure 221. Moreover, the covering portion 26 comprises a flexible claw 261. After the screw 25 is introduced into the tubular structure 221, the screw 25 drops down to the covering portion 26. Then, the head part (not shown) of the screw 25 is stopped by the flexible claw 261, so that the head part of the screw 25 is still stayed in the covering portion 26. By the way, while the screw 25 is introduced into the tubular structure 221 or the covering portion 26, a threaded part (not shown) of the screw 25 faces downwardly.

As the screwdriver bit 21 is continuously and upwardly moved in the second direction B, the screwdriver bit 21 is transferred through the first pushing part 2331 of the first swinging block 233 to the standby position as shown in FIGS. 3, 5 and 10. When the protrusion part 214 is transferred through the first pushing part 2331 again, the first pushing part 2331 is pushed upwardly by the protrusion part 214, so that the first swinging block 233 is rotated in the second rotation direction Y (see FIG. 14). Since the first hook-shaped element 232 is not pushed by the second pushing part 2332 when the first swinging block 233 is rotated in the second rotation direction Y, the first hook-shaped element 232 is still contacted with the slide rail 222. Under this circumstance, none of the screws 25 can be moved to the region between the first hook-shaped element 232 and the second hook-shaped element 234.

After the above flowchart is completed, the screwdriver bit 21 may be moved downwardly in the first direction A by the user again. Consequently, the screwing part 211 of the screwdriver bit 21 is locked into the head part of the screw 25. After an electric screwdriver connected with the fixing part 212 of the screwdriver bit 21 (see FIG. 6) is turned on, the screwdriver bit 21 is automatically rotated to tighten the screw 25 into an object (not shown). During the process of tightening the screw 25 into the object, the screw 25 is continuously moved downwardly to prop open the flexible claw 261. Consequently, the screw 25 is detached from the covering portion 26 (see FIG. 15).

More especially, when the screwing operation is performed by the user at the first time, a new screw 25 is also moved to the region between the first hook-shaped element 232 and the second hook-shaped element 234. After the screwing operation at the first time is completed and during the process of returning the screwdriver bit 21, the new screw 25 is introduced into the covering portion 26. Consequently, for performing the subsequent screwing operation, the user only has to move the screwdriver bit 21 in the first direction A.

Figure 16:
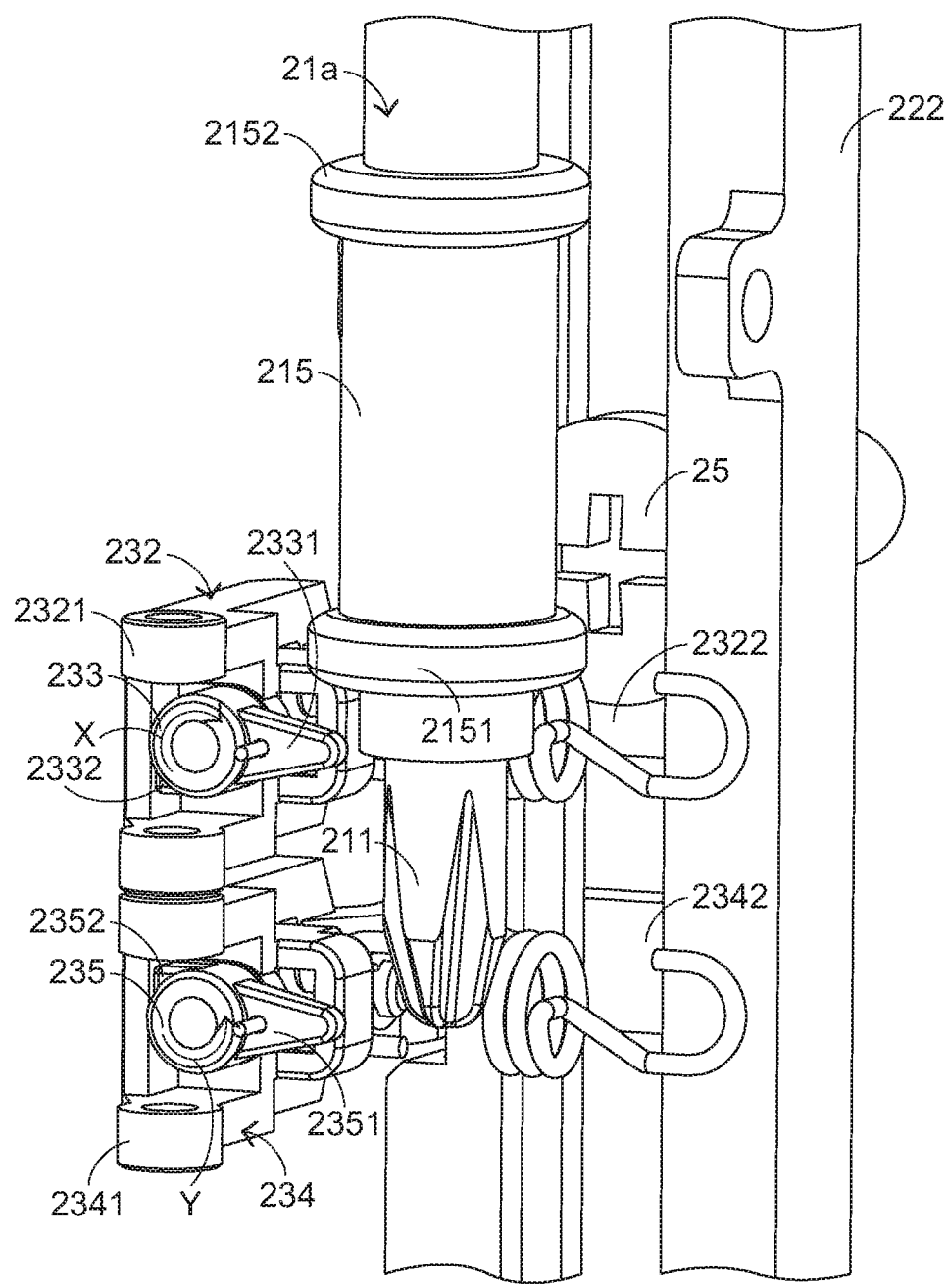
FIG. 16 is a schematic perspective view illustrating another exemplary screwdriver bit used in the screwing device according to the embodiment of the present invention.

Please refer to FIGS. 4, 5 and 16. FIG. 16 is a schematic perspective view illustrating another exemplary screwdriver bit used in the screwing device according to the embodiment of the present invention. The screwdriver bit 21a of the screwing device 2 comprises two protrusion parts 2151 and 2152. Consequently, the moving range of the screwdriver bit 21a is reduced. When the screwdriver bit 21a is been moved, the protrusion part 2152 is contacted with the bulge 2212 of the tubular structure 221. Consequently, the screwdriver bit 21a is not detached from the tubular structure 221. When the protrusion part 2151 is moved downwardly to push the first pushing part 2331 of the first swinging block 233 and the first pushing part 2331 and the second pushing part 2332 are rotated in the first rotation direction X, the screw 25 is moved to the region between the first hook-shaped element 232 and the second hook-shaped element 234. When the third pushing part 2351 of the second swinging block 235 is pushed upwardly by the protrusion part 2151 or 2152 and the third pushing part 2351 and the fourth pushing part 2352 are rotated in the second rotation direction Y, the screw 25 is transferred through the second hook-shaped element 234 and continuously and downwardly moved.

In case that the distance between the first swinging block 233 and the bulge 2212 is very long, the design of the screwdriver bit 21a is more feasible. That is, the upward movement of the screwdriver bit 21a is stopped until the protrusion part 2152 is contacted with the bugle 2212 of the tubular structure 221. Since it is not necessary to allow the protrusion part 2151 to be contacted with the bugle 2212, the moving range of the screwdriver bit 21a is reduced.

As shown in FIG. 16, the two protrusion parts 2151 and 2152 are integrally formed with a sleeve 215, but are not limited thereto. Alternatively, in some other embodiments, the two protrusion parts 2151 and 2152 are integrally formed with the screwdriver bit 21a or separately formed on the screwdriver bit 21a. The positions and shapes of the two protrusion parts 2151 and 2152 are presented herein for purpose of illustration and description only.

Figure 17:
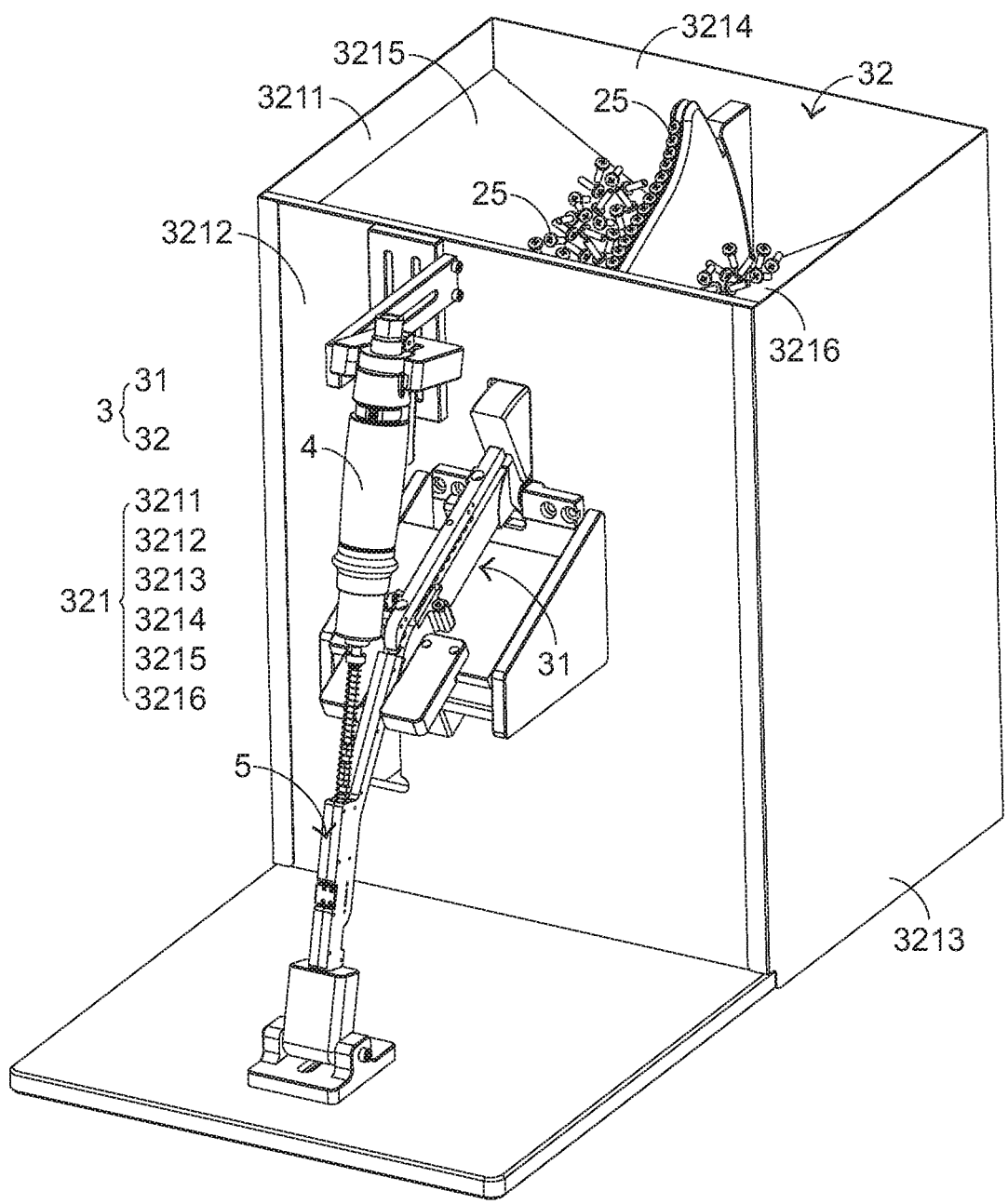
FIG. 17 is a schematic perspective view illustrating the outer appearance of a screw supplementary device according to an embodiment of the present invention.

Hereinafter, a screw supplementary device according to an embodiment of the present invention will be illustrated with reference to FIG. 17. FIG. 17 is a schematic perspective view illustrating the outer appearance of a screw supplementary device according to an embodiment of the present invention. The screw supplementary device 3 is used for automatically loading the screws 25 (see also FIG. 21) to the screwing device 5, which is connected with an electric screwdriver 4. The screw supplementary device 3 comprises a screw transferring portion 31 and a screw feeding portion 32. The components, assembling procedures and operating principles of the screwing device 5 are identical to those of the screwing device 2, and are not redundantly described herein.

Figure 18:
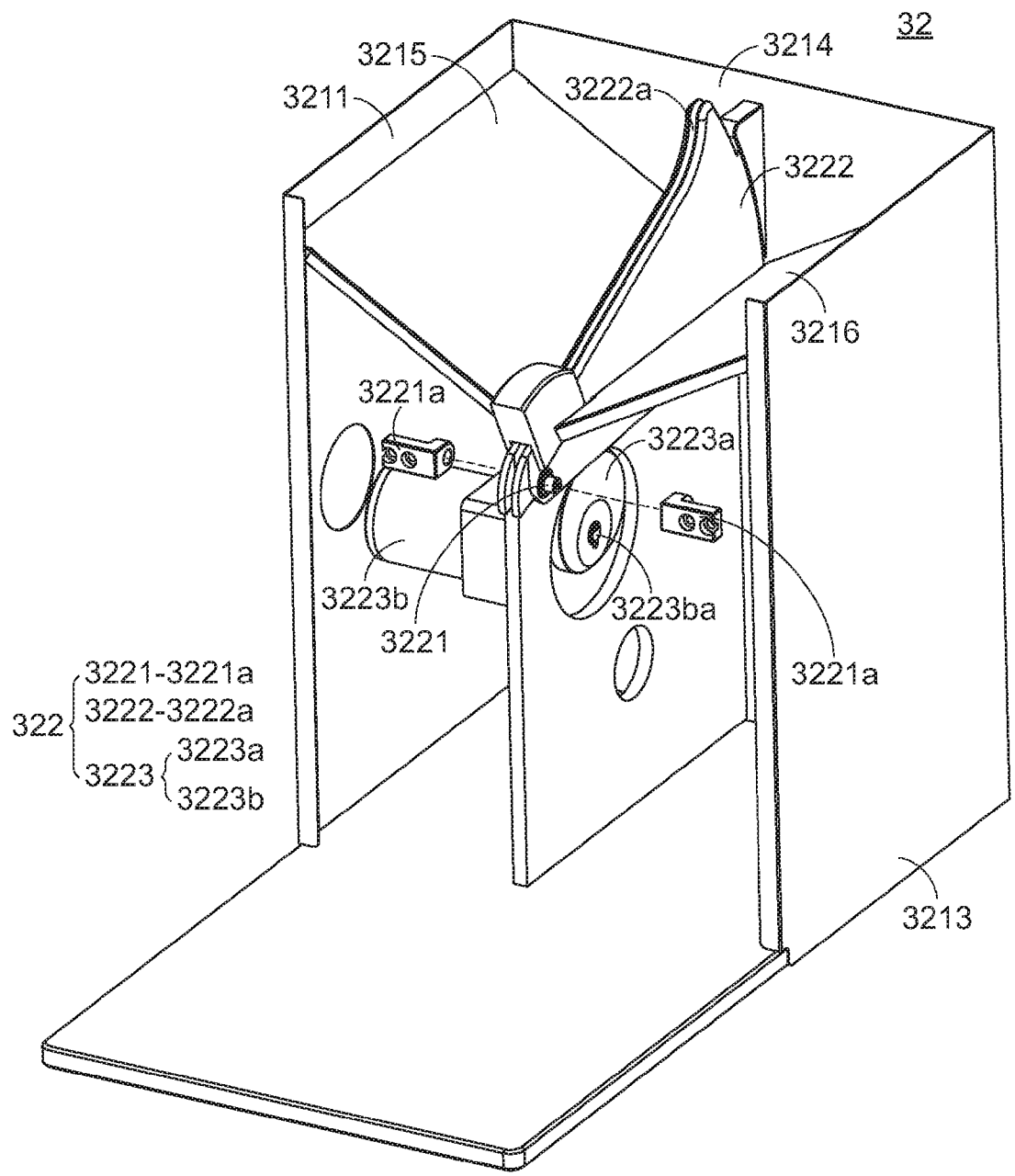
FIG. 18 is a schematic perspective view illustrating a first inner structure of the screw feeding portion of the screw supplementary device according to the embodiment of the present invention.
Figure 19:
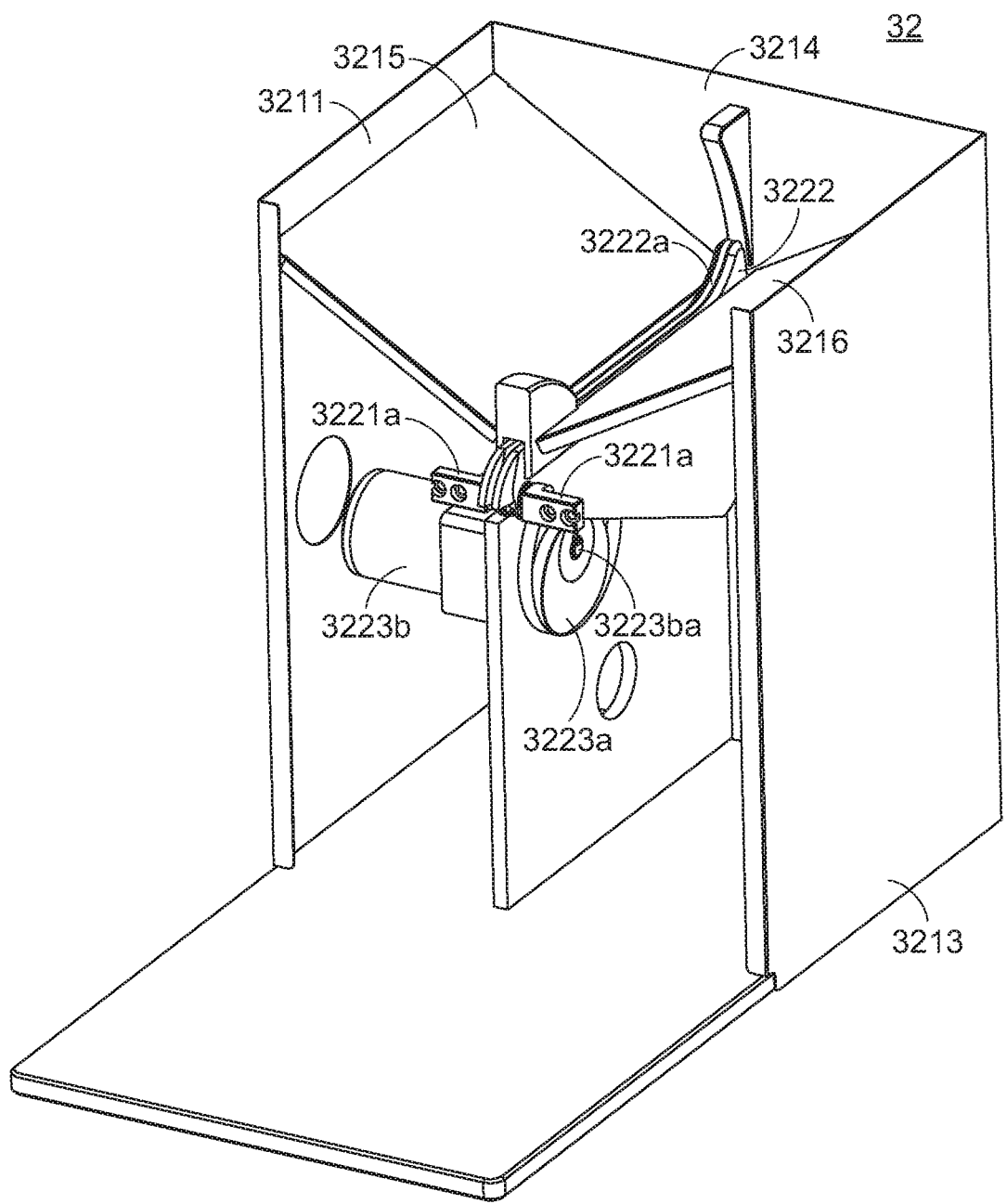
FIG. 19 is a schematic perspective view illustrating a second inner structure of the screw feeding portion of the screw supplementary device according to the embodiment of the present invention.

Hereinafter, the components and the assembling procedures of the screw feeding portion 32 will be illustrated with reference to FIGS. 17, 18 and 19. FIG. 18 is a schematic perspective view illustrating a first inner structure of the screw feeding portion of the screw supplementary device according to the embodiment of the present invention. FIG. 19 is a schematic perspective view illustrating a second inner structure of the screw feeding portion of the screw supplementary device according to the embodiment of the present invention. The screw feeding portion 32 comprises a box-shaped casing 321 and a screw drawing mechanism 322. The box-shaped casing 321 comprises a first lateral plate 3211, a second lateral plate 3212, a third lateral plate 3213, a fourth lateral plate 3214, a first supporting plate 3215, and a second supporting plate 3216. The first lateral plate 3211, the second lateral plate 3212, the third lateral plate 3213 and the fourth lateral plate 3214 are connected with each other. The first supporting plate 3215 is inclined downwardly from the first lateral plate 3211. The second supporting plate 3216 is inclined downwardly from the third lateral plate 3213. The screw drawing mechanism 322 comprises an axle 3221, a swinging part 3222, and a driving device 3223. The swinging part 3222 comprises an internally-concaved second conveying track 3222a. The driving device 3223 comprises a cam 3223a and a second motor 3223b.

For assembling the screw drawing mechanism 322, the axle 3221 is fixed on the second lateral plate 3212 through two fixing structures 3221a. The swinging part 3222 is pivotally coupled to the axle 3221, and arranged between the first supporting plate 3215 and the second supporting plate 3216. The cam 3223a and the second motor 3223b are disposed under the swinging part 3222. In addition, a rotating shaft 3223ba of the second motor 3223b is penetrated through the cam 3223a.

When the rotating shaft 3223ba is driven to be rotated by the second motor 3223b, the cam 3223a is correspondingly rotated. In response to the rotating cam 3223a, the swinging part 3222 is swung upwardly to a second position as shown in FIG. 18 or swung downwardly to a first position as shown in FIG. 19.

Figure 20:
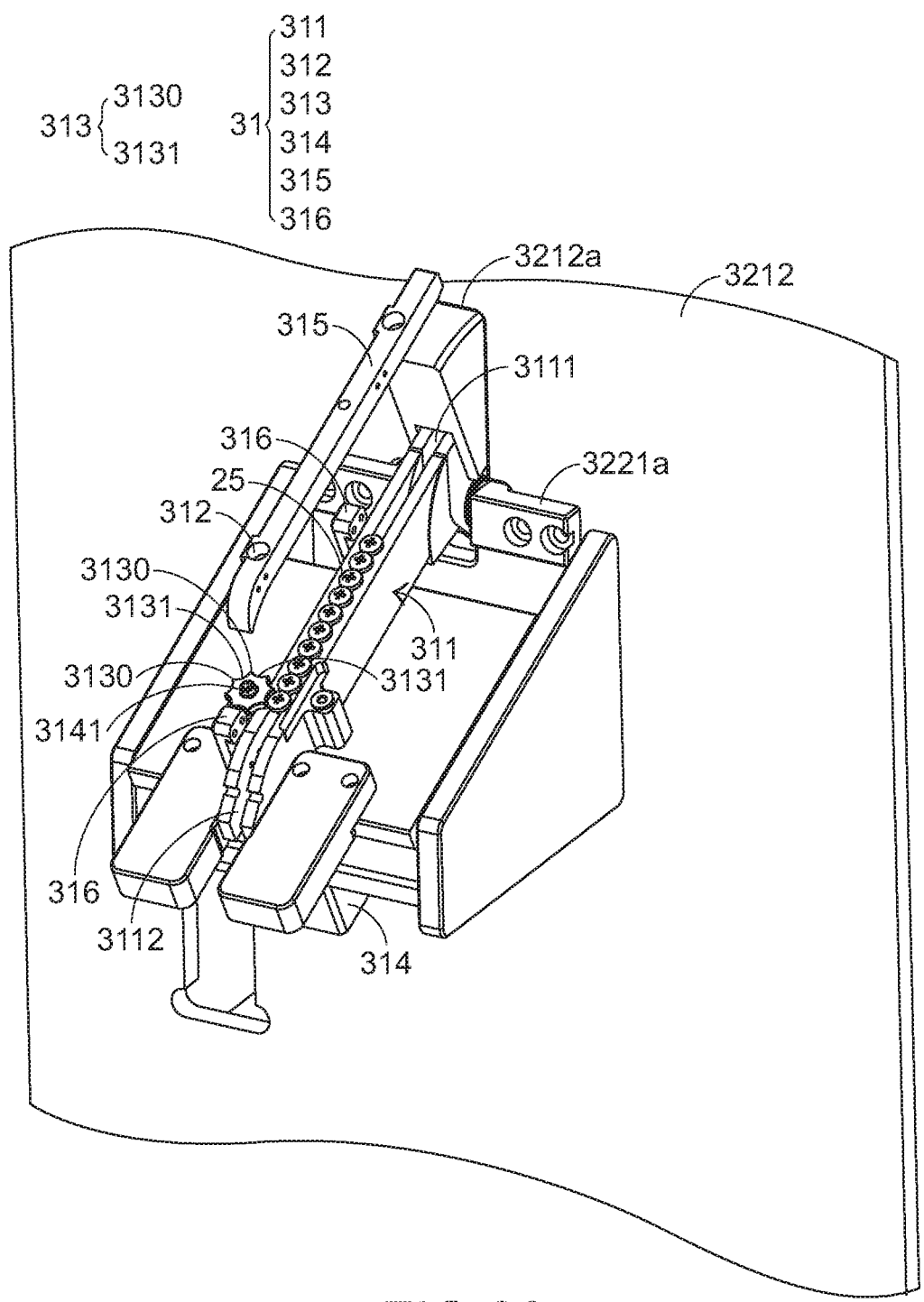
FIG. 20 is a schematic fragmentary exploded view illustrating the screw transferring portion of the screw supplementary device according to the embodiment of the present invention.
Figure 21:
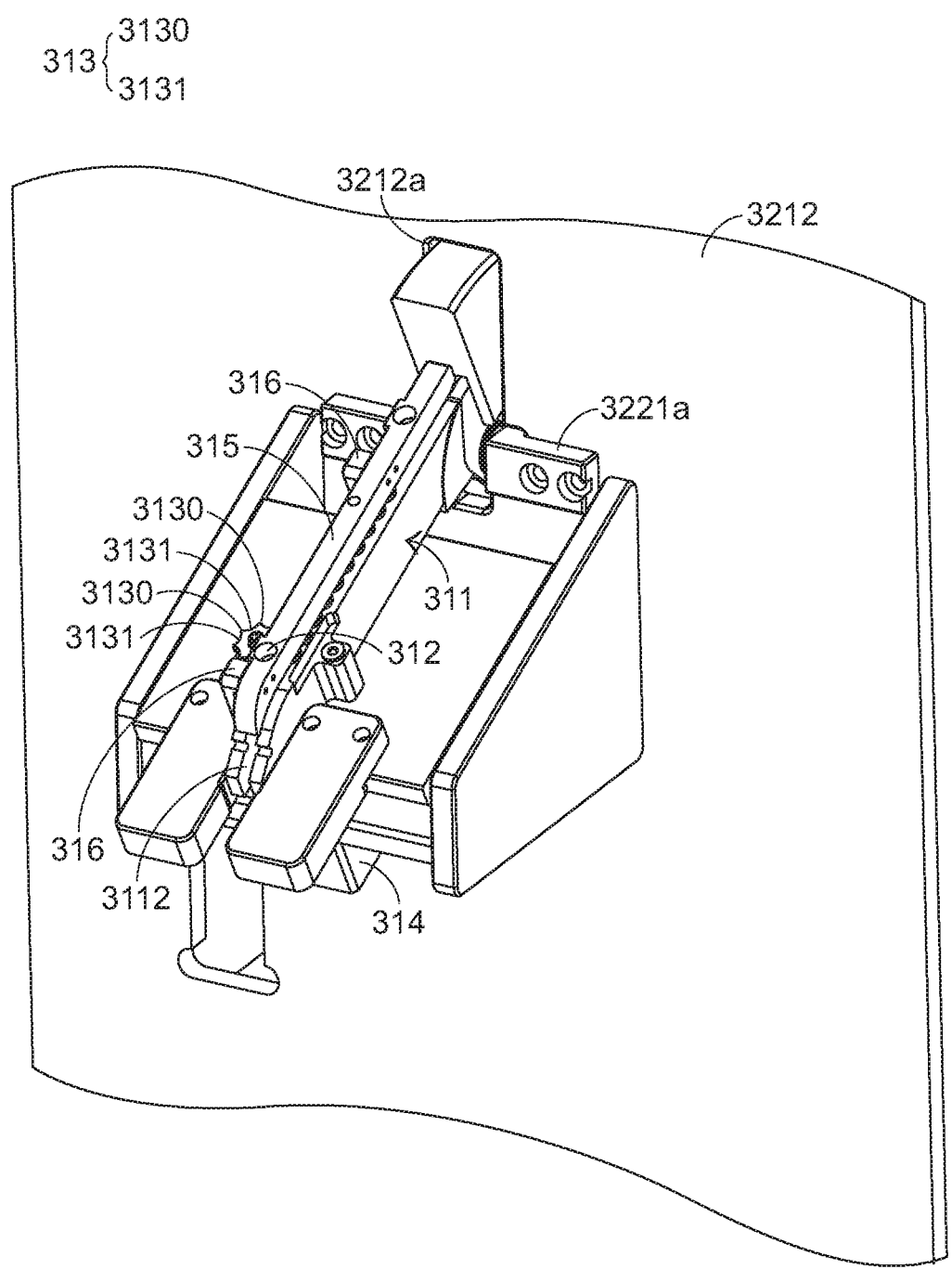
FIG. 21 is a schematic assembled view illustrating the screw transferring portion of the screw supplementary device according to the embodiment of the present invention.

Hereinafter, the components and the assembling procedures of the screw transferring portion 31 will be illustrated with reference to FIGS. 20 and 21. FIG. 20 is a schematic fragmentary exploded view illustrating the screw transferring portion of the screw supplementary device according to the embodiment of the present invention. FIG. 21 is a schematic assembled view illustrating the screw transferring portion of the screw supplementary device according to the embodiment of the present invention.

The screw transferring portion 31 comprises a first conveying track 311, a sensing element 312, a gear 313, a first motor 314, and a position-limiting block 315. The second lateral plate 3212 of the box-shaped casing 321 comprises a perforation 3212a. A front end of the first conveying track 311 is connected with the second conveying track 3222a through the perforation 3212a (see FIGS. 18 and 19). Through two protrusion posts 316, the position-limiting block 315 is fixed over the first conveying track 311. The sensing element 312 is disposed on the position-limiting block 315 and located over a rear end 3112 of the first conveying track 311. The gear 313 is located beside the rear end 3112 of the first conveying track 311. Moreover, a rotating shaft 3141 of the first motor 314 is penetrated through the gear 313.

Figure 22:
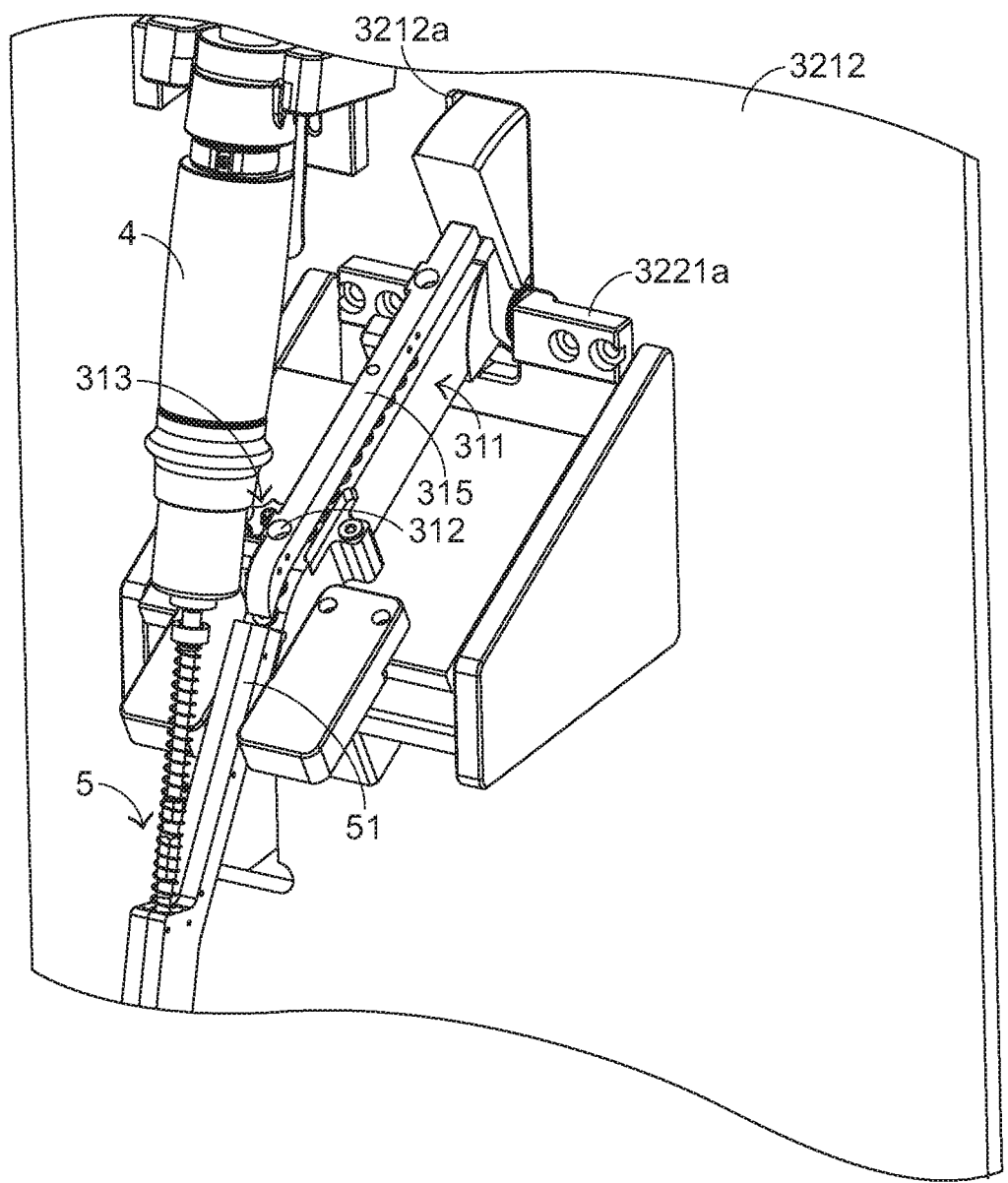
FIG. 22 is an enlarged fragmentary perspective view of the screw supplementary device according to the embodiment of the present invention.

Hereinafter, the operating principles of the screw supplementary device 3 will be illustrated with reference to FIGS. 17-22. FIG. 22 is an enlarged fragmentary perspective view of the screw supplementary device according to the embodiment of the present invention. When plural screws 25 are placed in the box-shaped casing 321 and the second motor 3223b is turned off, the swinging part 3222 is in the first position as shown in FIG. 19. Under this circumstance, the plural screws 25 are distributed on the surfaces of the first supporting plate 3215, the second supporting plate 3216 and the swinging part 3222.

After the second motor 3223b is turned on, the cam 3223a is rotated, and thus the swinging part 3222 is correspondingly swung to the second position as shown in FIG. 18. Consequently, the threaded parts of some gears 25 are embedded into the second conveying track 3222a of the swinging part 3222 and slid downwardly to the first conveying track 311 along the second conveying track 3222a.

After the screws 25 are moved to the first conveying track 311, the screws 25 are continuously and downwardly moved along the first conveying track 311. Since the positions of the screws 25 are limited by the position-limiting block 315, the moving screws 25 are not detached from the first conveying track 311. At the same time, the rotating shaft 3141 is driven to be rotated by the first motor 314. Consequently, the gear 313 is correspondingly rotated with the rotating shaft 3141. Upon rotation of the gear 313, the corresponding screw 25 is engaged with a concave part 3131 of the gear 313 and transferred through the sensing element 312, and finally the head part of the corresponding screw 25 is introduced into a slide rail 51 of the screwing device 5. The screwing device 5 is abutted against the first conveying track 311. Consequently, the purpose of automatically loading the screws 25 to the screwing device 5 is achieved. The structure and function of the slide rail 51 of the screwing device 5 are identical to those of the slide rail 222 of the screwing device 2, and are not redundantly described herein.

Generally, the slide rail 51 is only able to accommodate a limited number of screws. When the number of screws passing through the sensing element 312 reaches a predetermined value, the motor 314 stops driving rotation of the rotating shaft 3141, and thus the gear 313 is no longer rotated. After the rotation of the gear 313 is stopped, the screw 25 that is the closest to the rear end 3112 of the first conveying track 311 is stopped by a tooth part 3130 of the gear 313 or engaged with the concave part 3131 of the gear 313. Consequently, the gears 25 in the first conveying track 311 cannot be continuously moved. Under this circumstance, the screws 25 are stayed in the first conveying track 311 without being introduced into the slide rail 51 of the screwing device 5.

From the above descriptions, the screw stopping portion 23 of the screwing device 2 of the present invention is specially designed. Consequently, after the screwdriver bit 21 is moved in the first direction A and then the screwdriver bit 21 is moved in the second direction B, the screw 25 is automatically introduced into the tubular structure 221. After the screwing operation at the first time is completed, the purpose of automatically feeding the screw 25 is achieved. In other words, the screwing device 2 of the present invention has the simplified structure and is easily operated.

Moreover, the screw supplementary device 3 is capable of automatically loading the screws 25 into the slide rail 51 of the screwing device 5. By using the sensing element 312 and the gear 313 to control movement of the screws, an appropriate number of screws 25 may be loaded into the slide rail 51 of the screwing device 5. Consequently, the screw supplementary device 3 can be simply and quickly operated.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. A magazine type screwing device, comprising:
   a screwdriver bit comprising a protrusion part, wherein at least one screw is tightened into an object by the screwdriver bit;
   a storing portion accommodating the screwdriver bit and the at least one screw, wherein the storing portion comprises a tubular structure and a slide rail, wherein the tubular structure comprises an opening, and the screwdriver bit is installed in the tubular structure and movable within the tubular structure back and forth, wherein the slide rail is connected with the tubular structure, a distal end of the slide rail is located near the opening, and the at least one screw is disposed within the slide rail and movable within the slide rail; and
   a screw stopping portion limiting movement of the at least one screw, wherein the screw stopping portion comprises a rotating shaft, a first hook-shaped element, a first swinging block, a second hook-shaped element and a second swinging block, wherein the rotating shaft is disposed on the tubular structure, the first hook-shaped element is pivotally coupled to the rotating shaft and rotatable relative to the slide rail, the first swinging block is pivotally coupled to the first hook-shaped element and inserted into the tubular structure, the second hook-shaped element is pivotally coupled to the rotating shaft and rotatable relative to the slide rail, and the second swinging block is pivotally coupled to the second hook-shaped element and inserted into the tubular structure,
   wherein when the screwdriver bit is in a standby position, the first hook-shaped element and the second hook-shaped element are contacted with the slide rail to stop the at least one screw, wherein when the screwdriver bit is moved in a first direction and the first swinging block is pushed by the protrusion part, the first hook-shaped element is pushed by the first swinging block to be moved away the slide rail, so that a specified screw of the at least one screw is moved to a region between the first hook-shaped element and the second hook-shaped element, wherein when the screwdriver bit is moved in a second direction and the second swinging block is pushed by the protrusion part, the second hook-shaped element is pushed by second swinging block to be moved away the slide rail, so that the specified screw is introduced from the distal end of the slide rail to the tubular structure through the opening.

2. The magazine type screwing device according to claim 1, wherein after the specified screw is introduced into the tubular structure, the screwdriver bit is moved in the first direction to tighten the specified screw into the object.

3. The magazine type screwing device according to claim 1, wherein the protrusion part is integrally formed with the screwdriver bit.

4. The magazine type screwing device according to claim 1, wherein the magazine type screwing device further comprises a sleeve, wherein the sleeve is arranged around the screwdriver bit, and the protrusion part is integrally formed with the sleeve.

5. The magazine type screwing device according to claim 1, wherein the tubular structure and the slide rail are integrally formed with each other.

6. The magazine type screwing device according to claim 1, wherein the magazine type screwing device further comprises a covering portion, and the covering portion is connected with the tubular structure, wherein after the specified screw is departed from the tubular structure, the specified screw is supported and received by the covering portion.

7. The magazine type screwing device according to claim 6, wherein the covering portion comprises a flexible claw, wherein when the specified screw is stopped by the flexible claw, the specified screw is stayed within the covering portion.

8. The magazine type screwing device according to claim 1, wherein the magazine type screwing device further comprises a first elastic element, wherein the first elastic element is arranged around the screwdriver bit and allows the screwdriver bit to be returned to an original position thereof.

9. The magazine type screwing device according to claim 1, wherein the magazine type screwing device further comprises a bulge, and the bulge is disposed within the tubular structure, wherein when the screwdriver bit is in the standby position, the protrusion part is contacted with the bulge, so that the screwdriver bit is not detached from the tubular structure.

10. The magazine type screwing device according to claim 1, wherein the screwdriver bit comprises a screwing part and a fixing part, wherein after the screwing part is locked into the specified screw, the specified screw is tightened into the object, wherein the fixing part is connected with an electric screwdriver.

11. The magazine type screwing device according to claim 10, wherein the fixing part has a hexagonal shape or a circular shape.

12. The magazine type screwing device according to claim 1, wherein the first hook-shaped element is farther from the opening of the tubular structure than the second hook-shaped element.

13. The magazine type screwing device according to claim 1, wherein the first hook-shaped element comprises a first front end and a first rear end, and an included angle is formed between the first front end and the first rear end, wherein the second hook-shaped element comprises a second front end and a second rear end, and the included angle is formed between the second front end and the second rear end, wherein the first front end and the second front end are contactable with the slide rail, and the first rear end and the second rear end are pivotally coupled to the rotating shaft.

14. The magazine type screwing device according to claim 1, wherein the first hook-shaped element further comprises a first connecting shaft, and the first swinging block is pivotally coupled to the first connecting shaft, wherein the second hook-shaped element comprises a second connecting shaft, and the second swinging block is pivotally coupled to the second connecting shaft.

15. The magazine type screwing device according to claim 14, wherein the first swinging block comprises a first pushing part and a second pushing part, wherein when the first swinging block is not pushed by the protrusion part, the first pushing part is inserted into the tubular structure, and the second pushing part is contacted with the first hook-shaped element and located at a first side of the first connecting shaft to face the second hook-shaped element, wherein when the first swinging block is pushed by the protrusion part and the first swinging block is rotated in a first rotation direction, the first hook-shaped element is pushed by the second pushing part to be moved away the slide rail.

16. The magazine type screwing device according to claim 14, wherein the second swinging block comprises a third pushing part and a fourth pushing part, wherein when the second swinging block is not pushed by the protrusion part, the third pushing part is inserted into the tubular structure, and the fourth pushing part is contacted with the second hook-shaped element and located at a second side of the second connecting shaft to face the first hook-shaped element, wherein when the third swinging block is pushed by the protrusion part and the second swinging block is rotated in a second rotation direction, the second hook-shaped element is pushed by the fourth pushing part to be moved away the slide rail.

17. The magazine type screwing device according to claim 1, wherein the screw stopping portion further comprises:
- a second elastic element connected with the first hook-shaped element and the tubular structure, and allowing the first hook-shaped element to be returned to an original position thereof;
- a third elastic element connected with the first hook-shaped element and the first swinging block, and allowing the first swinging block to be returned to an original position thereof;
- a fourth elastic element connected with the second hook-shaped element and the tubular structure, and allowing the second hook-shaped element to be returned to an original position thereof; and
- a fifth elastic element connected with the second hook-shaped element and the second swinging block, and allowing the second swinging block to be returned to an original position thereof.

18. A screw supplementary device for loading at least one screw into a screwing device, the screw supplementary device comprising:
- a screw transferring portion comprising a first conveying track, a sensing element, a gear, and a first motor, wherein the at least one screw is moved along the first conveying track, the sensing element is disposed over a rear end of the first conveying track, the gear is located beside the rear end of the first conveying track to control movement of the at least one screw, and the first motor is connected with the gear to drive rotation of the gear; and a screw feeding portion connected with a front end of the first conveying track, wherein the at least one screw is received within the screw feeding portion and transmitted to the first conveying track, wherein when the gear is driven to be rotated by the first motor, the at least one screw is transferred through the gear and the sensing element and introduced into the screwing device that is connected with the first conveying track, wherein when the gear is not driven to be rotated by the first motor, one of the at least one screw is stopped by a tooth part of the gear or engaged with a concave part of the gear, so that the at least one screw is no longer moved, wherein when a number of the at least one screw passing through the sensing element reaches a predetermined value, the first motor stops driving rotation of the gear.

19. The screw supplementary device according to claim 18, wherein the screw feeding portion comprises:
- a box-shaped casing storing the at least one screw, and comprising a first supporting plate and a second supporting plate, wherein the first supporting plate and the second supporting plate are disposed within the box-shaped casing and inclined downwardly; and
- a screw drawing mechanism drawing the at least one screw from the box-shaped casing, and comprising an axle, a swinging part and a driving device, wherein the axle is connected with the box-shaped casing, the swinging part is pivotally coupled to the axle and arranged between the first supporting plate and the second supporting plate, the swinging part comprises a second conveying track, and the swinging part is swung upwardly or downwardly by the driving device, wherein when the swinging part is swung upwardly, the at least one screw is introduced into the second conveying track, and moved to the first conveying track along the second conveying track.

20. The screw supplementary device according to claim 19, wherein the box-shaped casing further comprises a perforation, wherein the second conveying track is connected with the first conveying track through the perforation.

21. The screw supplementary device according to claim 19, wherein the driving device comprises:
- a cam disposed under the swinging part; and
- a second motor connected with the cam, wherein when the cam is driven to be rotated by the second motor, the swinging part is correspondingly swung upwardly or downwardly.

22. The screw supplementary device according to claim 18, wherein the screw transferring portion further comprises a position-limiting block, wherein the position-limiting block is disposed over the first conveying track to prevent detachment of the at least one screw from the first conveying track, wherein the sensing element is disposed on the position-limiting block.

* * * * *